(12) United States Patent
Tokunaga

(10) Patent No.: US 7,215,799 B2
(45) Date of Patent: May 8, 2007

(54) CONTENT DATA PROCESSING SYSTEM, ELECTRONIC DEVICE APPARATUS, AND SERVER DEVICE

(75) Inventor: Keiichiro Tokunaga, Ebina (JP)

(73) Assignee: NTT Electronics Corporation (JP)

( * ) Notice: Subject to any disclaimer, the term of this patent is extended or adjusted under 35 U.S.C. 154(b) by 717 days.

(21) Appl. No.: 10/393,182

(22) Filed: Mar. 19, 2003

(65) Prior Publication Data

US 2003/0179914 A1 Sep. 25, 2003

(30) Foreign Application Priority Data

Mar. 19, 2002 (JP) ............................ P2002-077069

(51) Int. Cl.
*G06K 9/00* (2006.01)

(52) U.S. Cl. ...................... 382/125; 382/124; 713/186; 707/103 R

(58) Field of Classification Search ................ 382/100, 382/115, 124, 125, 116; 380/28, 30, 54; 713/182, 185, 186, 188; 235/380, 375; 340/825, 340/5.1, 5.2, 5.51, 5.53; 707/103 R, 2, 3; 714/38; 705/58

See application file for complete search history.

(56) References Cited

U.S. PATENT DOCUMENTS

| | | | | |
|---|---|---|---|---|
| 4,516,845 A | * | 5/1985 | Blakely et al. ............. 396/332 |
| 4,791,565 A | * | 12/1988 | Dunham et al. ............... 726/31 |
| 5,825,283 A | * | 10/1998 | Camhi ......................... 340/438 |
| 6,006,328 A | * | 12/1999 | Drake .......................... 726/23 |
| 6,021,212 A | * | 2/2000 | Ho .............................. 382/124 |
| 6,035,403 A | * | 3/2000 | Subbiah et al. ............... 726/28 |
| 6,035,406 A | * | 3/2000 | Moussa et al. ............... 726/18 |
| 6,041,411 A | * | 3/2000 | Wyatt .......................... 726/29 |
| 6,085,324 A | * | 7/2000 | Ogram .......................... 726/5 |

* cited by examiner

*Primary Examiner*—Sheela Chawan
(74) *Attorney, Agent, or Firm*—Kilpatrick Stockton LLP

(57) ABSTRACT

An electronic device apparatus includes: a generating unit for acquiring an authentication image containing an image of a fingerprint of an owner of the electronic device apparatus and/or an image of a possession of the owner, and for generating first authentication image data based on the given acquired authentication image; a write unit for writing the first authentication image data, to a recording medium which the owner has purchased; a read unit for reading given authentication image data from a recording medium to which the given authentication image data and given content data are written; a determination unit for comparing the given authentication image data with the first authentication image data, and for determining whether or not they match with each other; and a processing unit for processing the given content data based on a determination result by the determination unit.

9 Claims, 14 Drawing Sheets

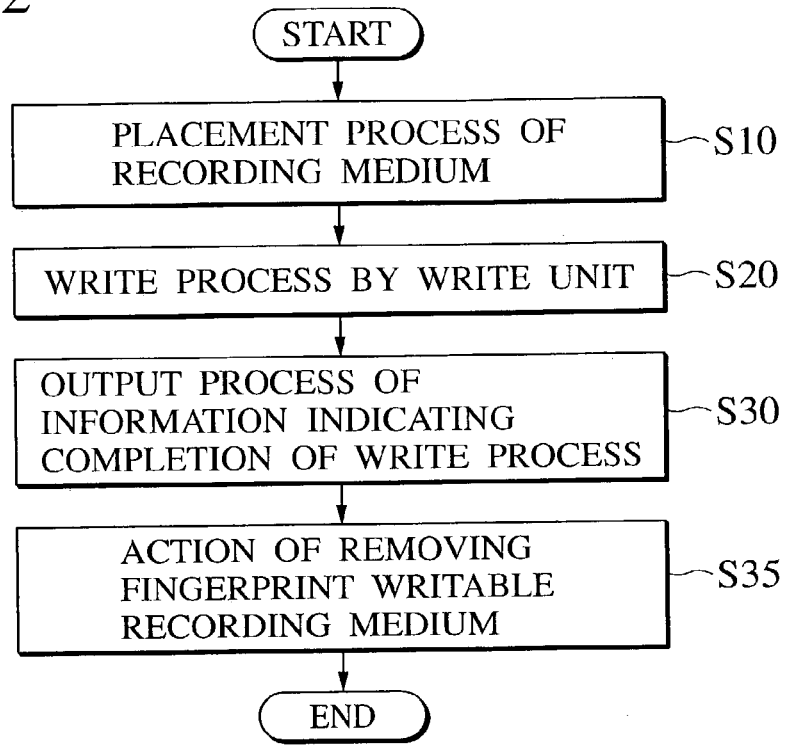
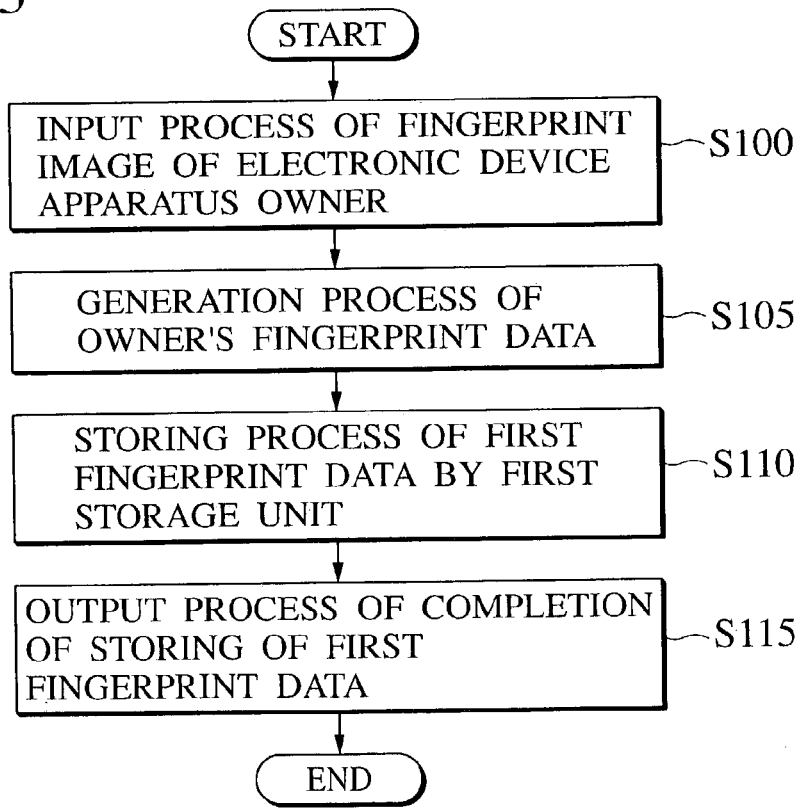

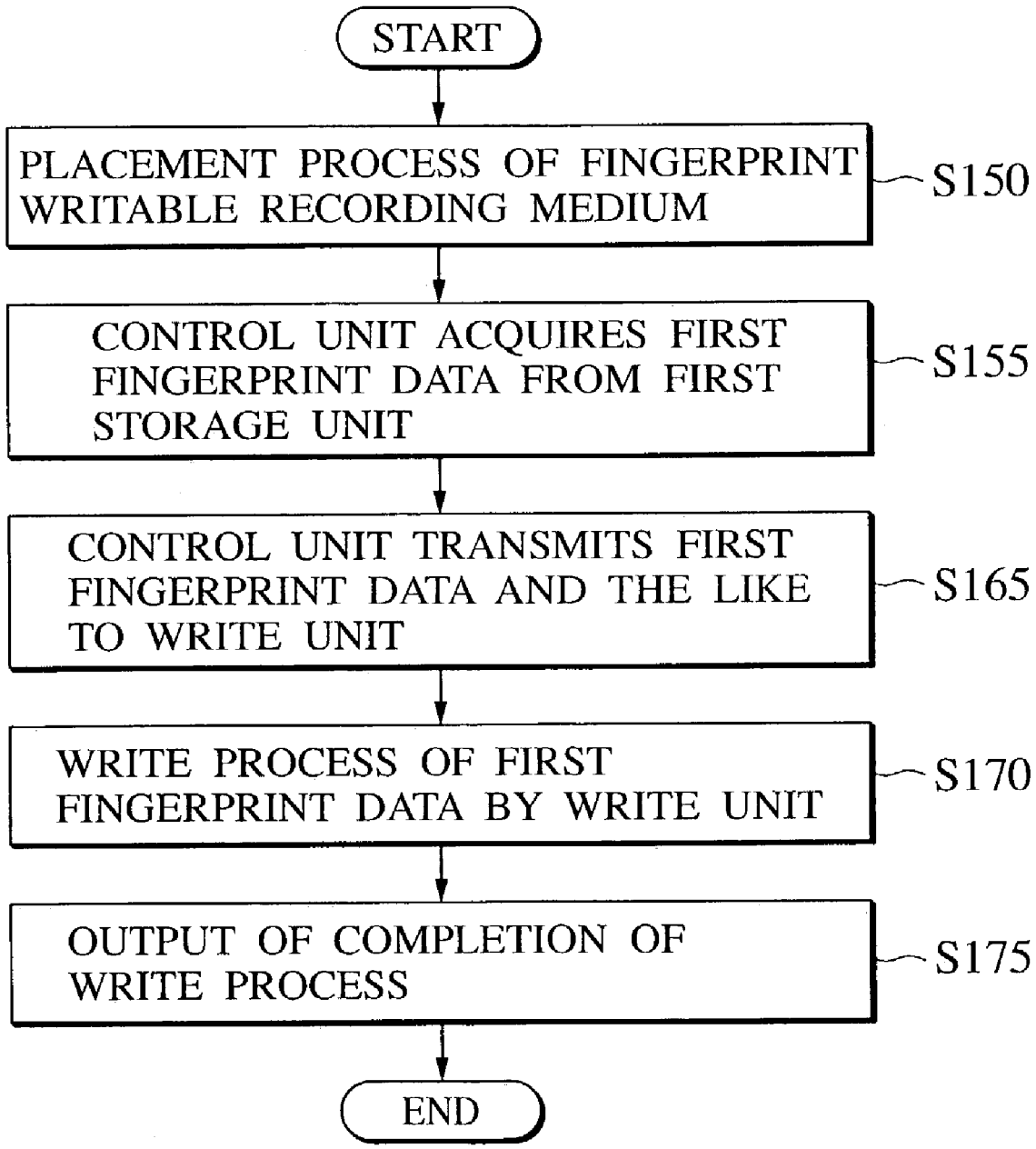

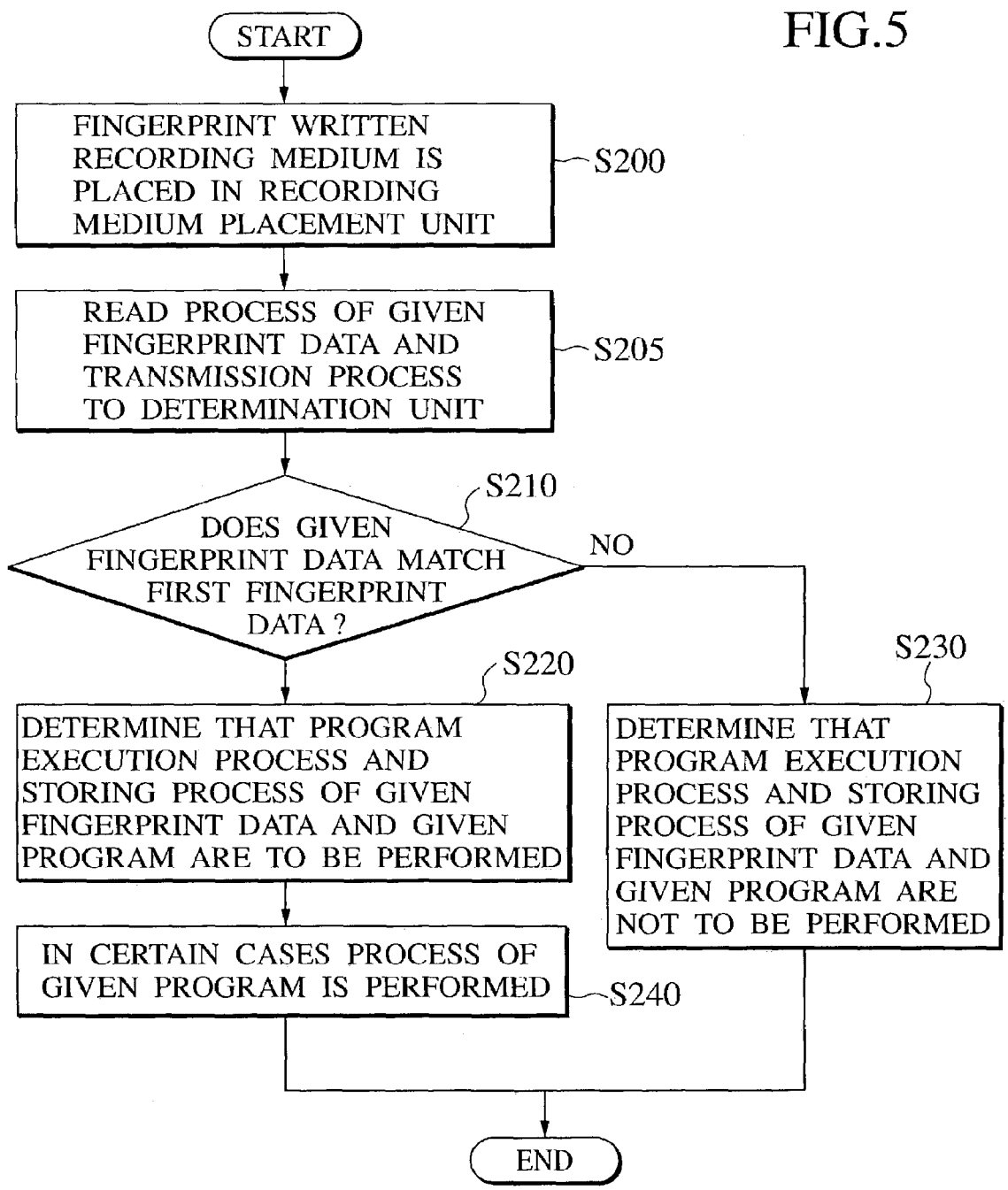

CONTENT DATA PROCESSING SYSTEM, ELECTRONIC DEVICE APPARATUS, AND SERVER DEVICE

CROSS REFERENCE TO RELATED APPLICATIONS

This application is based upon and claims the benefit of priority from the prior Japanese Patent Applications No. P2002-077069, filed on Mar. 19, 2002; the entire contents of which are incorporated herein by reference.

BACKGROUND OF THE INVENTION

1. Field of the Invention

The present invention relates to a content data processing system, an electronic device apparatus, and a server device such as a program which reads content data, from a recording medium having the content data written thereto, and processes the content data.

2. Description of the Related Art

Heretofore, a person, who has purchased from a shop of CDs, DVDs, video game software, or the like from a shop, a recording medium having content data (given program or music data, for example) recorded thereto, performs the following action. The purchaser inserts the recording medium into a given device (a PC terminal device, a CD player, a DVD player, or a video game device, for example). Then, the given device reads the content data and then processes the content data(for example, executing a given program or reproducing sound data, image data or video data).

However, heretofore, there has been the following problem. Heretofore, an action as below has been performed. The action is one in which a person who does not purchase the recording medium borrows the recording medium from the person who has purchased the recording medium, for example. According to such an action, the person who does not purchase the recording medium can cause, for example, his/her own PC terminal device to process the content data recorded on the recording medium (to process the content data is, for example, to execute a given program or to reproduce sound data, image data or video data).

It can be said that such an action infringes the rights (for example, copyrights) of program authors or data creators (sound, image or video data creators). However, in the present circumstances, such an action cannot be prevented.

Therefore, it has been desired to develop a system wherein a person other than the purchaser who has rightfully purchased the recording medium cannot cause a given device (his/her own PC terminal device, for example) to process the content data recorded on the recording medium.

BRIEF SUMMARY OF THE INVENTION

The present invention has the object of providing a content data processing system, an electronic device apparatus and a server device in which a person other than the purchaser who has rightfully purchased a recording medium as described above cannot cause a given device to process the content data recorded on the recording medium.

Specifically, among electronic device apparatuses of the present invention, one electronic device apparatus is an electronic device apparatus for reading content data from a recording medium to which content data containing at least any one of a program, character data, sound data, video data and image data is written, and for processing the content data. The electronic device apparatus has an authentication image data generator, a first storage, a writer, a reader, a determiner, and a processor. The authentication image data generator acquires an authentication image containing an image of a fingerprint of an owner of the electronic device apparatus and/or an image of a possession of the owner, and generates first authentication image data based on the acquired authentication image. The first storage stores the first authentication image data. The writer writes the first authentication image data, which is stored in the first storage, to the recording medium which the owner has purchased. The reader reads given authentication image data from a recording medium to which the given authentication image data and given content data are written. The determiner compares the given authentication image data with the first authentication image data stored in the first storage, and determines whether or not they match with each other. The processor processes the given content data based on a determination result by the determiner.

BRIEF DESCRIPTION OF THE SEVERAL VIEWS OF THE DRAWINGS

FIG. 2 is a flowchart for explaining a process for generating a fingerprint-writable recording medium in the embodiment 1.

FIG. 3 is a flowchart for explaining a process for storing first fingerprint data in the embodiment 1.

FIG. 4 is a flowchart for explaining a process for writing fingerprint data of a purchaser in the embodiment 1.

FIG. 5 is a flowchart for explaining a fingerprint data comparing process and an execution process by an execution unit.

DETAILED DESCRIPTION OF THE INVENTION

Figure 1:
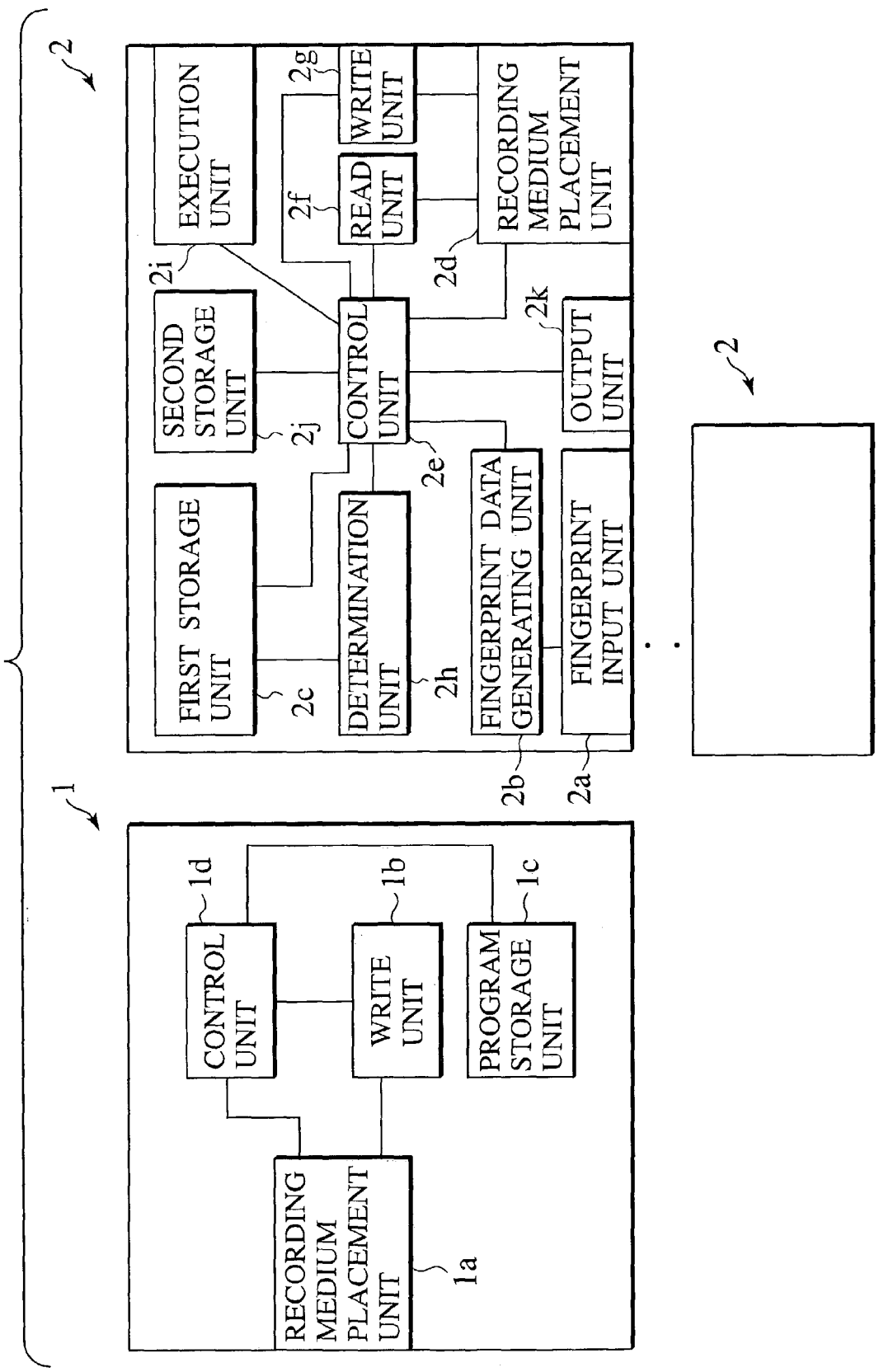
FIG. 1 is a diagram showing the configuration of a content data processing system of an embodiment 1.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

Generally and as it is conventional in the representation of devices, it will be appreciated that the various drawings are not drawn to scale from one figure to another nor inside a given figure.

In the following descriptions, numerous specific details are set forth such as specific signal values, etc. to provide a thorough understanding of the present invention. However, it will be obvious to those skilled in the art that the present invention may be practiced without such specific details. In other instances, well-known circuits have been shown in block diagram form in order not to obscure the present invention with unnecessary detail.

Embodiment 1

(Configuration)

FIG. 1 is a diagram showing the configuration of a content data processing system in embodiment 1. As content data, there are a program, character data, sound data, video data and image data, for example. In the present embodiment, a description in the case where the content data is a program will be given as an example. As an authentication image, there is an image relating to a human body (a fingerprint image, for example) and/or an image relating to a human possession (an image of a seal impression, for example). In the present embodiment, a description in the case where the authentication image is a fingerprint image will be given as an example. Descriptions of embodiments 2 and 3 as well as modified examples thereof, which will be described later, will also be given in the same way (descriptions in the case where the content data is a program, and descriptions in the case where the authentication image is a fingerprint image).

The content data processing system has a device 1 for generating a fingerprint-writable recording medium (hereinafter, this device is simply referred to as a generating device) and a plurality of electronic device apparatuses 2.

(Generating Device)

A generating device 1 generates a fingerprint-writable recording medium by use of an existing recording medium. The existing recording medium, for example, is a recording medium to which data can be written only once. The existing recording medium is a CD-R, for example. Also, the existing recording medium may also be a recording medium to which data can be written any number of times. However, this recording medium needs to be constituted so that fingerprint data and a given program can be written thereto only once. The type of the existing recording medium is not particularly limited as long as it is a recording medium satisfying such conditions.

The generating device 1 has a recording medium placement unit 1a for placing a recording medium therein, a write unit 1b for writing various data to the recording medium placed in the recording medium placement unit 1a, a program storage unit 1c for storing a given program, and a control unit id for controlling each unit.

The recording medium placement unit 1a is provided with a recording medium sensor unit (not shown) for detecting whether or not a recording medium is placed therein. Then, when a recording medium is placed in the recording medium placement unit 1a, the recording medium sensor unit detects that the recording medium is placed therein, and transmits information which indicates that the recording medium is placed therein, to the control unit 1d.

The write unit 1b accesses the recording medium placed in the recording medium placement unit 1a and writes given data thereto. To be more precise, the write unit 1b performs the following process. The write unit 1b then writes information which indicates that the fingerprint data area is an area for writing fingerprint data, to a second predetermined area (hereinafter, the second predetermined area is referred to as the recording information area) on the recording medium. Note that the write unit 1b does not write data to a first predetermined area on the recording medium (hereinafter, the first predetermined area is referred to as the fingerprint data area).

Moreover, the write unit 1b acquires a program from the program storage unit 1c. The write unit 1b writes the program to a third predetermined area (hereinafter, the third predetermined area is referred to as the program recording area) on the recording medium. Furthermore, the write unit 1b writes the information described below to the recording information area on the recording medium. This information indicates that the program has been recorded in the program recording area. The various above-described information is recorded on the existing recording medium, whereby a fingerprint-writable recording medium is generated. Note that one piece of fingerprint data (fingerprint data corresponding to a fingerprint of one person) is recorded in the fingerprint data area.

As such a program, for example, there are an application program (such as a program relating to word processing software or spreadsheet software) and a video game program.

Moreover, the generating device 1 has an input unit (not shown) for an operator to input various information and an output unit (not shown) for outputting various information.

(Electronic Device Apparatus)

Each electronic device apparatus 2 has a fingerprint input unit 2a, a fingerprint data generating unit 2b, a first storage unit 2c, a second storage unit 2j, a recording medium placement unit 2d, a read unit 2f, a write unit 2g, a determination unit 2h, an execution unit 2i, and a control unit 2e for controlling each unit. In the present embodiment, a description in the case where the electronic device apparatus 2 is a personal computer (PC) terminal device or a video game device will be given as an example. Moreover, in the present embodiment, a description in the case where owners of the electronic device apparatuses are different from each other will be given as an example.

The execution unit 2i has a function of executing content data (program, for example). Also, the second storage unit 2j has a function of storing the content data. Accordingly, it can be said that both the execution unit 2i and the second storage unit 2j process the content data. Note that, as described later, the second storage unit 2j also stores data (fingerprint data) other than the content data.

A fingerprint image (an authentication image) of the owner of the electronic device apparatus 2 is inputted into the fingerprint input unit 2a. To be more precise, the fingerprint image is inputted, for example, in the following way. The owner brings his/her given finger (right thumb, for example) into contact with the fingerprint input unit 2a in accordance with a predetermined manner. For instance, the owner brings his/her finger into contact with the fingerprint input unit 2a so that the center of the fingerprint input unit 2a matches the center of the finger. By this contact, the fingerprint image of the owner is inputted into the fingerprint input unit 2a.

Incidentally, a fingerprint image of a person other than the owner of the electronic device apparatus 2 can also be inputted into the fingerprint input unit 2a. However, when the electronic device apparatus 2 is started up for the first time after the owner of the electronic device apparatus 2 has purchased the electronic device apparatus 2, the fingerprint image of the owner of the electronic device apparatus 2 is inputted into the fingerprint input unit 2a.

Then, the fingerprint data generating unit 2b acquires the fingerprint image inputted into the fingerprint input unit 2a. The fingerprint data generating unit 2b generates fingerprint data (authentication image data) based on the acquired fingerprint image. Here, the fingerprint data of the owner, which is generated by the fingerprint data generating unit 2b in the stage of starting up the electronic device apparatus 2 for the first time (hereinafter the stage is referred to as the initial stage) after the owner of the electronic device apparatus 2 has purchased the electronic device apparatus 2, is referred to as the first fingerprint data.

The first storage unit 2c stores the first fingerprint data generated by the fingerprint data generating unit 2b. The first fingerprint data once it has been stored in the first storage unit 2c cannot be rewritten from the outside.

In the recording medium placement unit 2d, a fingerprint-writable recording medium purchased by the owner is placed. To be more precise, the recording medium placement unit 2d is provided with a recording medium sensor unit (not shown) for detecting whether or not a recording medium is placed therein. When a recording medium is placed in the recording medium placement unit 2d, the recording medium sensor unit detects that the recording medium is placed therein, and transmits information which indicates that the recording medium is placed therein, to the control unit 2e.

The read unit 2f accesses each area on a fingerprint-writable recording medium placed in the recording medium placement unit 2d. The read unit 2f transmits information read from each area on the fingerprint-writable recording medium to the control unit 2e. The read unit 2f reads given fingerprint data from the recording medium (a recording medium having the given fingerprint data and a given program written thereto) placed in the recording medium placement unit 2d.

The write unit 2g writes the first fingerprint data, which is stored in the first storage unit 2c, to the fingerprint data area on a fingerprint-writable recording medium placed in the recording medium placement unit 2d. Note that if the first fingerprint data has already been written to the fingerprint data area, the write unit 2g does not perform the writing process of fingerprint data.

In the case that a recording medium having given fingerprint data and a given program written thereto is placed in the recording medium placement unit 2d and then the given fingerprint data is read by the read unit 2f, the determination unit 2h performs the following process. The determination unit 2h compares the given fingerprint data with the first fingerprint data stored in the first storage unit 2c and determines whether or not they match with each other.

To be more precise, the above is exemplified as follows. The recording medium having the given fingerprint data and the given program written thereto is placed in the recording medium placement unit 2d. Then, the read unit 2f accesses the fingerprint data area on the recording medium placed in the recording medium placement unit 2d. The read unit 2f reads the given fingerprint data (fingerprint data of the purchaser who has purchased the recording medium) from the fingerprint data area and transmits the given fingerprint data to the determination unit 2h.

The determination unit 2h holds the given fingerprint data transmitted from the read unit 2f. The determination unit 2h reads the first fingerprint data (this first fingerprint data is not always the fingerprint data of the purchaser of the recording medium) from the first storage unit 2c. Then, the determination unit 2h compares the given fingerprint data held therein with the first read fingerprint data, and determines whether or not they match with each other.

Based on the determination result of the determination unit 2h, the control unit 2e performs the following process. If the given fingerprint data matches the first fingerprint data, the control unit 2e decides that the execution unit 2i is to execute the given program written to the recording medium. If the given fingerprint data matches the first fingerprint data, the control unit 2e also decides that the given fingerprint data and the given program that have been written to the recording medium are to be stored in the second storage unit 2j (that is, to be subjected to an install process).

When the given fingerprint data matches the first fingerprint data and the execution unit 2i receives an instruction to execute the program from the control unit 2e, the execution unit 2i performs the following process. The execution unit 2i reads the program, which is written to the recording medium placed in the recording medium placement unit 2d, through the read unit 2f. The execution unit 2i decodes the read program and executes the program based on the decoded result.

On the other hand, in the case that the given fingerprint data matches the first fingerprint data and the fingerprint data and an instruction to install the program are inputted into an input unit (not shown), the control unit 2e performs the following process. The control unit 2e reads the given fingerprint data and the given program, which are written to the recording medium placed in the recording medium placement unit 2d, through the read unit 2f. The control unit 2e stores the given fingerprint data and the given program in the second storage unit 2j. The second storage unit 2j is, for example, a hard disk drive.

Note that the electronic device apparatus 2 has an input unit (not shown) for a person such as the owner of the electronic device apparatus 2 to input various information, and an output unit 2k for outputting various information.

(Program Execution Method Using Content Data Processing System)

(1) A Process of Generating a Fingerprint-writable Recording Medium

FIG. 2 is a flowchart for explaining a process of generating a fingerprint-writable recording medium by use of the content data processing system.

An operator places an existing recording medium (a recording medium to which data can be written only once, for example)in the recording medium placement unit 1*a* (S10). Then, the recording medium sensor unit provided in the recording medium placement unit 1*a* detects that the recording medium is placed therein, and transmits information which indicates that the recording medium is placed therein, to the control unit 1*d*.

The control unit 1*d* reads the program from the program storage unit 1*c* and transmits the program to the write unit 1*b*. Moreover, the control unit 1*d* instructs the write unit 1*b* to perform a predetermined write process to the recording medium. The write unit 1*b* performs the predetermined write process to the recording medium (S20).

To be more precise, the above is exemplified as follows. The write unit 1*b* does not write data to the fingerprint data area on the recording medium. The write unit 1*b* writes the program to the program recording area on the recording medium. The write unit 1*b* writes information specifying the fingerprint data area (address information, for example) and information specifying the program recording area (address information, for example), to the recording information area on the recording medium.

When the write process is completed, the write unit 1*b* transmits information indicating the completion of the write process, to the control unit 1*d*. To the output unit (not shown), the control unit 1*d* outputs information indicating that generation of the fingerprint-writable recording medium has been completed (S30). By this process of S30, the operator can recognize that the generation of the fingerprint-writable recording medium has been completed. The operator takes out the fingerprint-writable recording medium from the recording medium placement unit 1*a* (S35). One or more fingerprint-writable recording mediums are purchased by the owner of the electronic device apparatus 2, for example, through a shop.

(2) A Process in Which the Owner of the Electronic Device Apparatus 2 Stores His/Her Fingerprint Data in the Electronic Device Apparatus 2

FIG. 3 is a flowchart for explaining a process in which the owner of the electronic device apparatus 2 stores his/her fingerprint data in the electronic device apparatus 2. Note that this process is performed when the electronic device apparatus is started up for the first time after the owner of the electronic device apparatus 2 purchased the electronic device apparatus 2.

The owner of the electronic device apparatus 2 inputs their fingerprint image using the fingerprint input unit 2*a* (S100). The fingerprint data generating unit 2*b* generates fingerprint data of the owner based on the inputted fingerprint image (S105). The generated fingerprint data (first fingerprint data) of the owner is transmitted to the first storage unit 2*c* through the control unit 2*e*. The first storage unit 2*c* stores the transmitted first fingerprint data (S110). The first storage unit 2*c* transmits information indicating that the first fingerprint data has been stored, to the control unit 2*e*. The control unit 2*e* causes the output unit 2*k* to output information indicating that the process of storing the first fingerprint data has been completed (S115).

(3) A Process of Writing to a Fingerprint-writable Recording Medium Fingerprint Data of the Purchaser of the Recording Medium FIG. 4 is a flowchart for explaining a process of writing the fingerprint data of the purchaser of a fingerprint-writable recording medium to the recording medium. First, the owner of the electronic device apparatus 2 purchases the fingerprint-writable recording medium described above, for example, through a shop. Hereinafter, in this process (3), the owner of the electronic device apparatus 2 is referred to as the purchaser.

The purchaser of the fingerprint-writable recording medium places the fingerprint-writable recording medium in the recording medium placement unit 2*d* of his/her own electronic device apparatus 2 (S150). Then, the recording medium sensor unit detects that the recording medium is placed therein. The recording medium sensor unit transmits information indicating that the recording medium is placed therein, to the control unit 2*e*.

The control unit 2*e* acquires the first fingerprint data from the first storage unit 2*c* (S155). Then, the control unit 2*e* instructs the read unit 2*f* to transmit information specifying the fingerprint data area. The read unit 2*f* executes the instruction. Specifically, the read unit 2*f* accesses the recording information area on the recording medium and reads the information specifying the fingerprint data area from the recording information area. The read unit 2*f* transmits the read information specifying the fingerprint data area to the control unit 2*e*.

The control unit 2*e* transmits the stored first fingerprint data and the information specifying the fingerprint data area to the write unit 2*g*. The control unit 2*e* instructs the write unit 2*g* to perform a process of writing fingerprint data (S165).

The write unit 2*g* accesses the fingerprint data area on the recording medium. The write unit 2*g* writes the first fingerprint data to the fingerprint data area (S170). When the writing process of the write unit 2*g* is completed, information indicating the completion of the write process is transmitted to the control unit 2*e*. The control unit 2*e* causes the output unit 2*k* to output information indicating that the process of writing the fingerprint data of the owner has been completed (S175).

Incidentally, the purchaser may input an instruction to execute the program recorded on the recording medium using the input unit in a state where the recording medium is placed in the recording medium placement unit 2*d*. In this case, the instruction is transmitted to the control unit 2*e*. The control unit 2*e* acquires the program through the read unit 2*f* in accordance with the instruction. The control unit 2*e* transmits the acquired program to the execution unit 2*i*. The execution unit 2*i* decodes the program and executes the program based on the decoded result.

Similarly, the purchaser may input an instruction to install the program recorded on the recording medium using the input unit in a state where the recording medium is placed in the recording medium placement unit 2*d*. In this case, the install instruction is transmitted to the control unit 2*e*. The control unit 2*e* acquires the first fingerprint data and the given program through the read unit 2*f* in accordance with the install instruction. The control unit 2*e* causes the second storage unit 2*j* to store the acquired first fingerprint data and the given program.

Then, the purchaser removes the fingerprint-writable recording medium to which the first fingerprint data and the given program have been written (hereinafter above fingerprint-writable recording medium is referred to as the fingerprint-written recording medium) from the recording medium placement unit 2*d*. Note that the purchaser is also the owner of the fingerprint-written recording medium.

(4) A Fingerprint Data-comparing Process by the Determination Unit 2*h*, an Execution Process by the Execution Unit 2*i*, and a Storing Process by the Second Storage Unit 2*j*

When a fingerprint-written recording medium is placed in the electronic device apparatus 2 after the above-described process of (3), the following process is performed. FIG. 5 is a flowchart for explaining a fingerprint data-comparing process by the determination unit 2h, an execution process by the execution unit 2i, and a storing process by the second storage unit 2j.

First, the holder, who holds the fingerprint-written recording medium having given fingerprint data and a given program, places the fingerprint-written recording medium in the recording medium placement unit 2d of the electronic device apparatus 2 possessed by the holder (S200). Then, information indicating that the fingerprint-written recording medium is placed therein is transmitted to the control unit 2e.

Here, the holder is not always the owner of the fingerprint-written recording medium. For example, it can be said that a case wherein the holder borrows the fingerprint-written recording medium from the owner of the fingerprint-written recording medium is a case where the holder is not the owner.

The control unit 2e instructs the read unit 2f to read the fingerprint data (hereinafter referred to as the given fingerprint data). The read unit 2f accesses the recording information area on the recording medium, and acquires information specifying the fingerprint data area from the recording information area. The read unit 2f reads the given fingerprint data in accordance with the information specifying the fingerprint data area. The read unit 2f transmits the read given fingerprint data to the determination unit 2h through the control unit 2e (S205).

If the read unit 2f cannot read fingerprint data from the fingerprint data area, information indicating that fingerprint data cannot be read is transmitted to the control unit 2e. Then, the processes of Steps S155, S165, S170, and S175 are performed.

The determination unit 2h reads the first fingerprint data (fingerprint data of the owner of the electronic device apparatus 2) from the first storage unit 2c. The determination unit 2h compares the given fingerprint data with the first fingerprint data, and determines whether or not they match with each other (S210).

If the given fingerprint data matches the first fingerprint data, the determination unit 2h transmits the determination result (information indicating the match) to the control unit 2e. The control unit 2e decides that the execution unit 2i is to execute the program recorded on the recording medium and that the given fingerprint data and the program are to be stored in the second storage unit 2j (S220).

If the given fingerprint data does not match the first fingerprint data, the determination unit 2h transmits the determination result (information indicating noncoincidence) to the control unit 2e. The control unit 2e decides that the execution unit 2i is not to execute the program recorded on the recording medium and that the given fingerprint data and the program are not to be stored in the second storage unit 2j. The control unit 2e causes the output unit 2k to output the determination result (S230).

In certain cases, the given program (content data) is processed (S240). To be more precise, the above is exemplified as follows. When a program execution request is inputted to the input unit, the request is transmitted to the control unit 2e. The control unit 2e reads the program from the recording medium and transmits the program to the execution unit 2i. The execution unit 2i decodes the program and executes the program based on the decoded result.

Similarly, when a program install request is inputted to the input unit, for example, the request is notified to the control unit 2e. The control unit 2e reads the given fingerprint data and the program from the recording medium. The control unit 2e stores the given fingerprint data and the program in the second storage unit 2j.

(The Functions and Effects)

According to the present embodiment, the first storage unit 2c of each electronic device apparatus 2 stores the first fingerprint data, which is fingerprint data of the owner of the electronic device apparatus 2. After the owner has purchased a fingerprint-writable recording medium, the recording medium is placed in the electronic device apparatus 2. Then, the first fingerprint data stored in the first storage unit 2c is written to the recording medium.

When a recording medium having given fingerprint data and the program written thereto is placed in the electronic device apparatus 2, the read unit 2f reads the given fingerprint data from the recording medium. Then, the determination unit 2h compares the given fingerprint data with the first fingerprint data stored in the first storage unit 2c and determines whether or not they match with each other. If they match with each other, processing of content data is performed. Specifically, an execution process of the program by the execution unit 2i (and/or a process of storing the given fingerprint data and the program in the second storage unit 2j) is performed. Meanwhile, if the given fingerprint data does not match the first fingerprint data, processing of the content data (the above-described execution or storing, for example) is not performed.

Accordingly, when a person who has borrowed a recording medium having given fingerprint data and a program written thereto from the owner of the recording medium, for example, tries to cause his/her own electronic device apparatus 2 to process content data (for example, to process content data is to execute the program or to install the program), processing of content data is not performed because the fingerprint data recorded on the recording medium does not match the first fingerprint data.

Consequently, only a person who has purchased a fingerprint-writable recording medium can cause a given device (his/her own electronic device apparatus 2, for example) to process the content data (to execute the program written to the recording medium, for example). Therefore, according to the present embodiment, a person other than the rightful purchaser of a fingerprint-writable recording medium cannot cause a given device to process content data recorded on the recording medium (to execute a program, for example). Thus, an unauthorized process(or act) relating to content data recorded on the recording medium (unauthorized copying, for example) can be reliably prevented.

MODIFIED EXAMPLE 1

In the above-described embodiment 1, if fingerprint data recorded on a fingerprint-written recording medium does not match the first fingerprint data stored in the first storage unit 2c, the determination unit 2h decides that the processing of content data (such as an execution process of a program or a storing process of given fingerprint data and the program) is not to be performed. This process may be modified as follows.

Specifically, if the determination unit 2h determines that the given fingerprint data does not match the first fingerprint data, the output unit 2k outputs information indicating that a fingerprint of the owner of the recording medium (the recording medium having the given fingerprint data and a given program written thereto) is requested. Note that the determination unit 2h holds the given fingerprint data temporarily.

Then, a person using the electronic device apparatus 2 inputs his/her fingerprint image using the fingerprint input unit 2a in accordance with the output by the output unit 2k. Subsequently, the fingerprint data generating unit 2b acquires the inputted fingerprint image and generates second fingerprint data based on the acquired fingerprint image.

The generated second fingerprint data is transmitted to the determination unit 2h. The determination unit 2h compares the given fingerprint data held therein with the generated second fingerprint data, and determines whether or not they match with each other. If the given fingerprint data matches the second fingerprint data, the control unit 2e decides that the execution unit 2i is to execute the given program. Thereafter, when a request for executing the given program is inputted to the input unit, the execution unit 2i executes the given program.

Similarly, if the given fingerprint data matches the second fingerprint data, the control unit 2e decides that the given fingerprint data and the given program are to be stored in the second storage unit 2j. Moreover, if a request for installing the given program and the given fingerprint data are inputted to the input unit, the given fingerprint data and the given program are stored in the second storage unit 2j.

The determination unit 2h may also perform the comparing process as follows. The determination unit 2h determines whether or not the given fingerprint data matches the second fingerprint data based on a given criterion. Specifically, the case wherin the determination unit 2h determines that the given fingerprint data matches the second fingerprint data is not limited to the case wherein the given fingerprint data completely matches the second fingerprint data.

For example, if 90% of the given fingerprint data matches 90% of the second fingerprint data, the determination unit 2h determines that the given fingerprint data matches the second fingerprint data. The reason for this is as follows.

It is assumed that a fingerprint image is inputted to the fingerprint input unit 2a based on a given finger of a certain person, for example. Moreover, it is assumed that a fingerprint image is thereafter inputted to the fingerprint input unit 2a based on the same given finger of the certain person again. In this case, it can be said that a fingerprint image which completely matches the fingerprint image previously inputted (a fingerprint image which matches the fingerprint image previously inputted with accuracy in the order of several microns) will not be inputted to the fingerprint input unit 2a again. Accordingly, in the case where the determination unit 2h determines that the given fingerprint data matches the second fingerprint data only when 100% of the given fingerprint data matches 100% of the second fingerprint data, the following drawback arises: the determination unit 2h always determines that the given fingerprint data does not match the second fingerprint data.

According to the present modified example, the effect described below can be obtained in addition to the effect of the embodiment 1. In the present modified example, when the determination unit 2h determines that the given fingerprint data does not match the first fingerprint data, a purchaser can input a fingerprint image using the fingerprint input unit 2a. The fingerprint data generating unit 2b generates second fingerprint data based on the inputted fingerprint image. Then, if the determination unit 2h determines that the given fingerprint data matches the second fingerprint data, processing of given content data (execution process of a program, for example) is performed.

Accordingly, the owner of a fingerprint-written recording medium can cause the electronic device apparatus 2 which he/she does not possess to process content data (to execute a program, for example). Consequently, according to the modified example 1, the purchaser of a fingerprint-writable recording medium can always cause, for example, the electronic device apparatus 2 to execute a program, and a person other than the purchaser cannot cause, for example, the electronic device apparatus 2 to execute a program. Therefore, it is possible to prevent an unauthorized act by a person other than a purchaser (act of causing the electronic device apparatus 2 to execute a program by a person other than a purchaser, for example), and the convenience of a purchaser can be improved.

MODIFIED EXAMPLE 2

In the modified example 1, when the determination unit 2h performs the comparing process and determines that the given fingerprint data does not match the second fingerprint data, the given fingerprint data and the given program are not stored in the second storage unit 2j. In the present modified example, the given fingerprint data and the given program may be stored in the second storage unit 2j independently of the comparison result by the determination unit 2h.

Note that, in this case, it is necessary to prevent a person other than the purchaser of the recording medium from causing the electronic device apparatus 2 to execute the given program. For this purpose, each unit is required to have the function described below.

The determination unit 2h compares the given fingerprint data with the first fingerprint data stored in the first storage unit 2c and/or the second fingerprint data generated by the fingerprint data generating unit 2b. The determination unit 2h determines whether or not the given fingerprint data matches the first fingerprint data or the second fingerprint data. If the given fingerprint data matches at least one of them, the control unit 2e decides that the execution unit 2i is to execute the program stored in the second storage unit 2j. Thereafter, when a request for executing the given program is inputted to the input unit, the execution unit 2i executes the given program.

If the given fingerprint data matches neither of them, the control unit 2e decides that the execution unit 2i is not to execute the program stored in the second storage unit 2j.

In this way, even if the program is installed in the electronic device apparatus 2 which is not possessed by the purchaser of the recording medium, the given fingerprint data installed does not match the first fingerprint data stored in the first storage unit. Accordingly, it is possible to prevent the situation where a person other than the purchaser freely causes the electronic device apparatus 2 (electronic device apparatus 2 possessed by the person other than the purchaser, for example) to execute the program. Contrarily, if the given fingerprint data matches the second fingerprint data generated by the fingerprint data generating unit 2b, execution of the program is performed. Therefore, the purchaser can cause a device other than his/her own electronic device apparatus 2 to execute the program. Accordingly, the present modified example can improve the convenience of a purchaser.

When the purchaser of a recording medium wishes to cause the electronic device apparatus 2 of a friend of his/hers to execute a program recorded on the recording medium, for example, the purchaser can cause the electronic device apparatus 2 to execute the program.

MODIFIED EXAMPLE 3

In the above-described embodiment, the determination unit 2h performs a process of comparing the fingerprint data based on whether or not a given criterion is satisfied. In the present modified example, the process of comparing the fingerprint data may be modified as below.

In the determination process of Step S210, the determination unit 2h may determine that the given fingerprint data matches the first fingerprint data in the case that 100% of the given fingerprint data completely matches 100% of the first fingerprint data. In this case, the determination unit 2h performs coincidence determination based on bits in data. Specifically, when the determination unit 2h compares the above-described two pieces of fingerprint data and they are different from each other in even one bit, the determination unit 2h determines that the given fingerprint data does not match the first fingerprint data.

Thus, even if the purchaser of a fingerprint-writable recording medium possesses a plurality of electronic device apparatuses 2 (PC terminal devices), a process using one fingerprint-written recording medium (such as a program execution process or a program install process) is performed by only one electronic device apparatus 2 (PC terminal device).

When the purchaser X of a fingerprint-writable recording medium possesses a plurality of electronic device apparatuses 2, for example, the first fingerprint data of the purchaser X is stored in the first storage unit 2c of each electronic device apparatus 2. In this case, it can be said that the first fingerprint data stored in each first storage unit 2c differs from each other in accordance with bit-based determination.

To be more precise, the above is exemplified as follows. When the purchaser X inputs a fingerprint image of his/her right thumb using the fingerprint input unit 2a multiple times, for example, the method of inputting the fingerprint image by the purchaser X is slightly different each time. Specifically, the method of placing the finger in relation to the fingerprint input unit 2a each time differs when a determination is made with accuracy in the order of several microns.

Accordingly, it can be said that the fingerprint data, which is generated by the fingerprint data generating unit 2b of each electronic device apparatus 2, differs from each other in accordance with bit-based determination, and that the first fingerprint data stored in each first storage unit 2c differs from each other in accordance with bit-based determination.

Therefore, when first fingerprint data is written to a recording medium (a recording medium having a program written thereto) purchased by a purchaser, fingerprint data that completely matches the first fingerprint data is stored in only one electronic device apparatus 2 (PC terminal device) possessed by the purchaser.

Accordingly, the program purchased by the purchaser is executed by only one electronic device apparatus 2. Regarding a given program (a program relating to spreadsheet software or word processing software, for example),the following is a requirement. It is necessary that even if the purchaser purchases the recording medium having the given program, only one electronic device apparatus 2 among a plurality of electronic device apparatuses 2 possessed by the purchaser can execute the program. According to the content data processing system of the present modified example, the above-described requirement can be satisfied.

MODIFIED EXAMPLE 4

In the above-described embodiment, the fingerprint data generated by the fingerprint data generating unit 2b is, unchanged, stored in the first storage unit 2c, and the first fingerprint data stored in the first storage unit 2c is written to the fingerprint-writable recording medium. The above-described process may be modified as follows. Fingerprint data is subjected to a security process (an encryption process, a randomized process, or a feature process, for example). In the first storage unit 2c, fingerprint data on which a security process has been performed may be stored. Also, the fingerprint data on which the security process has been performed may be written to the fingerprint-writable recording medium. Hereinafter, the encryption process, the randomization process, and the feature process will be described in modified examples 4, 5, and 6, respectively.

Figure 6:
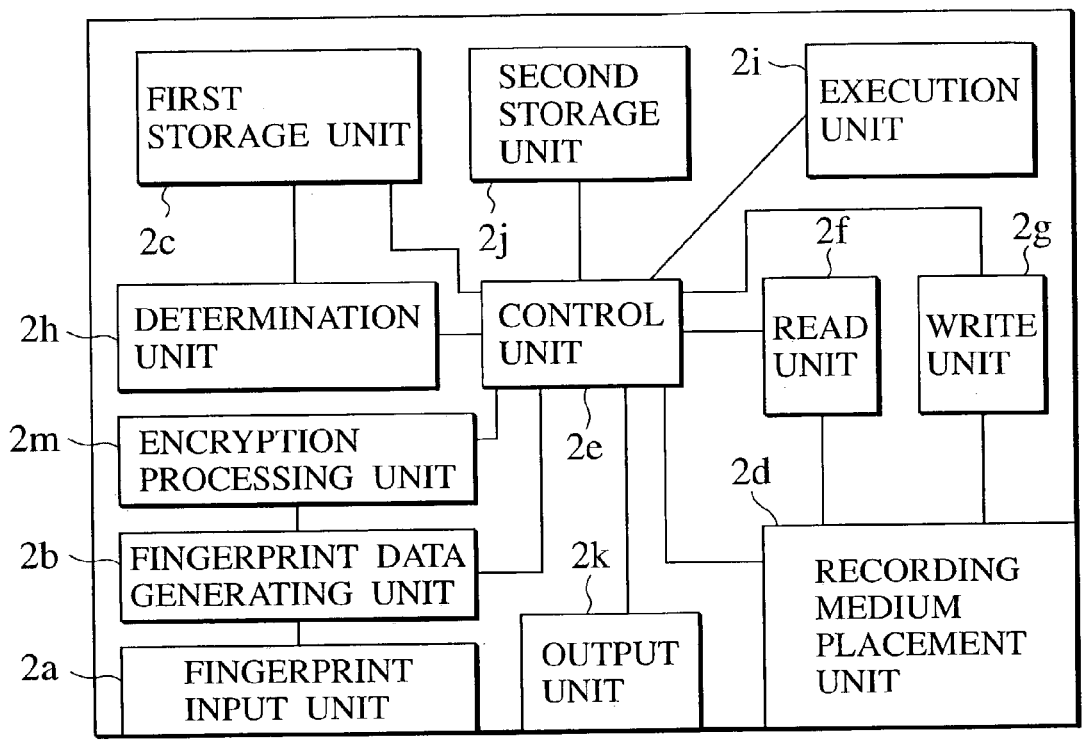
FIG. 6 is a diagram showing the configuration of an electronic device apparatus of a modified example 4 of the embodiment 1.

FIG. 6 is a diagram showing the configuration of an electronic device apparatus 2 according to the modified example 4. In FIG. 6, the same components as those of the electronic device apparatus 2 of the embodiment 1 will be denoted by the same reference numerals, and a description thereof will be omitted. The electronic device apparatus 2 has an encryption processing unit 2m. The encryption processing unit 2m performs the encryption process for the first fingerprint data generated by the fingerprint data generating unit 2b. Then, the encryption processing unit 2m outputs the encrypted fingerprint data to the control unit 2e.

In the present modified example, the method of encryption is not particularly limited. The encryption processing unit 2m, for example, can generate the encrypted first fingerprint data (hereinafter referred to as the first encrypted fingerprint data) based on a given encryption function, given key information, and the inputted first fingerprint data.

Moreover, the encryption processing unit 2m stores the first encrypted fingerprint data in the first storage unit 2c. The write unit 2g writes the first encrypted fingerprint data to the fingerprint data area on a fingerprint-writable recording medium.

When a recording medium having given encrypted fingerprint data and a given program is placed in the recording medium placement unit 2d, the read unit 2f reads the given encrypted fingerprint data from the recording medium. The read given encrypted fingerprint data is transmitted to the determination unit 2h.

The determination unit 2h compares the given encrypted fingerprint data recorded on the recording medium with the first encrypted fingerprint data stored in the first storage unit 2c, and determines whether or not they match with each other. At this time, similarly to the modified example 3, the determination process of the match is performed based on bits in data, for example.

If the given encrypted fingerprint data matches the first encrypted fingerprint data, the control unit 2e decides that the execution unit 2i is to execute the program. Thereafter, when a request for executing the given program is inputted to the input unit, the execution unit 2i executes the given program.

Moreover, if the given encrypted fingerprint data matches the first encrypted fingerprint data, the control unit 2e decides that the given encrypted fingerprint data and the given program are to be stored in the second storage unit 2j.

Thereafter, when a request for installing the given program is inputted to the input unit, the given encrypted fingerprint data and the given program are stored in the second storage unit 2j.

MODIFIED EXAMPLE 5

Figure 7:
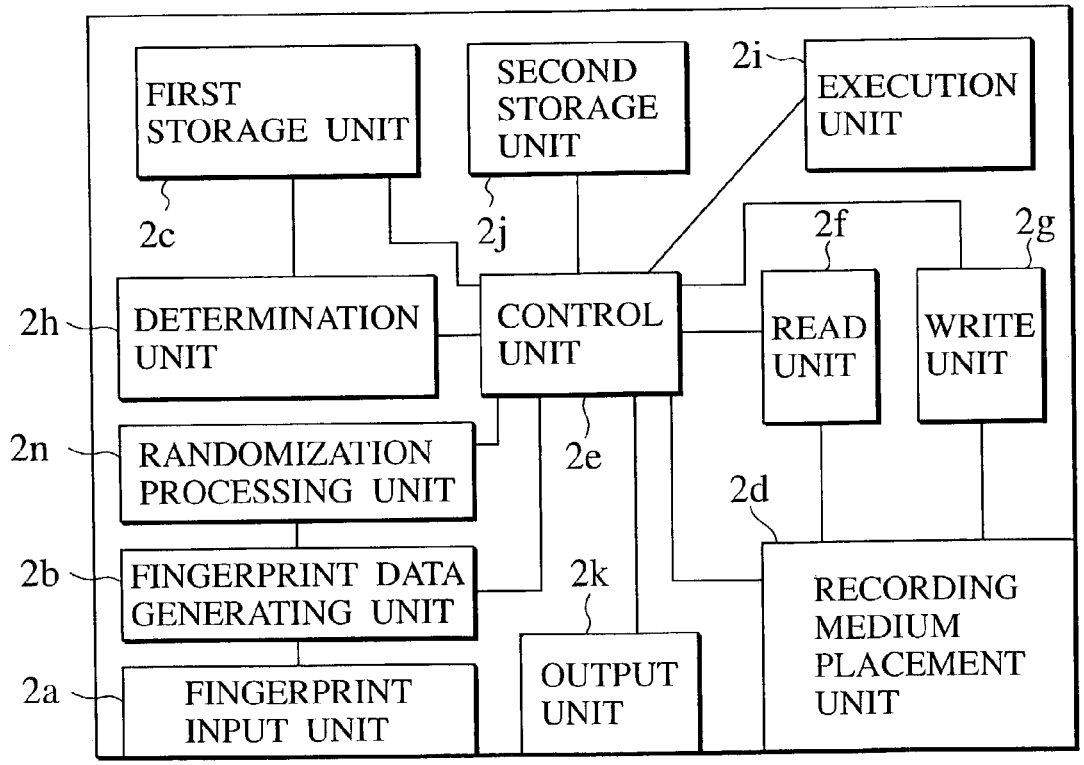
FIG. 7 is a diagram showing the configuration of an electronic device apparatus of a modified example 5 of the embodiment 1.

FIG. 7 is a diagram showing the configuration of an electronic device apparatus 2 according to the modified example 5. In FIG. 7, the same components as those of the electronic device apparatus 2 of the embodiment 1 will be denoted by the same reference numerals, and a description thereof will be omitted. The electronic device apparatus 2 of the modified example 5 has a randomization processing unit 2n. The randomization processing unit 2n combines random number data generated by a random number generator (not shown) and first fingerprint data generated by a fingerprint data generating unit 2b to generate randomized first fingerprint data (hereinafter referred to as the first randomized fingerprint data). In the present modified example, the method of randomization is not particularly limited.

Moreover, the randomization processing unit 2n causes a first storage unit 2c to store the first randomized fingerprint data therein. A write unit 2g writes the first randomized fingerprint data to the fingerprint data area on a fingerprint-writable recording medium.

When a recording medium having given randomized fingerprint data and a given program is placed in a recording medium placement unit 2d, a read unit 2f reads the given randomized fingerprint data from the recording medium. The read given randomized fingerprint data is transmitted to a determination unit 2h.

The determination unit 2h compares the given randomized fingerprint data recorded on the recording medium with the first randomized fingerprint data stored in the first storage unit 2c, and determines whether or not they match with each other. At this time, similarly to the modified example 3, the determination process of the match is performed based on bits in data, for example.

After the above-described determination process, a process by a control unit 2e, a process by an execution unit 2i, and a process by a second storage unit 2j are performed. Descriptions of the process by the control unit 2e, the process by the execution unit 2i, and the process by the second storage unit 2j are the same as those in the descriptions of the modified example 4 in which "encrypted" is substituted by "randomized".

MODIFIED EXAMPLE 6

Figure 8:
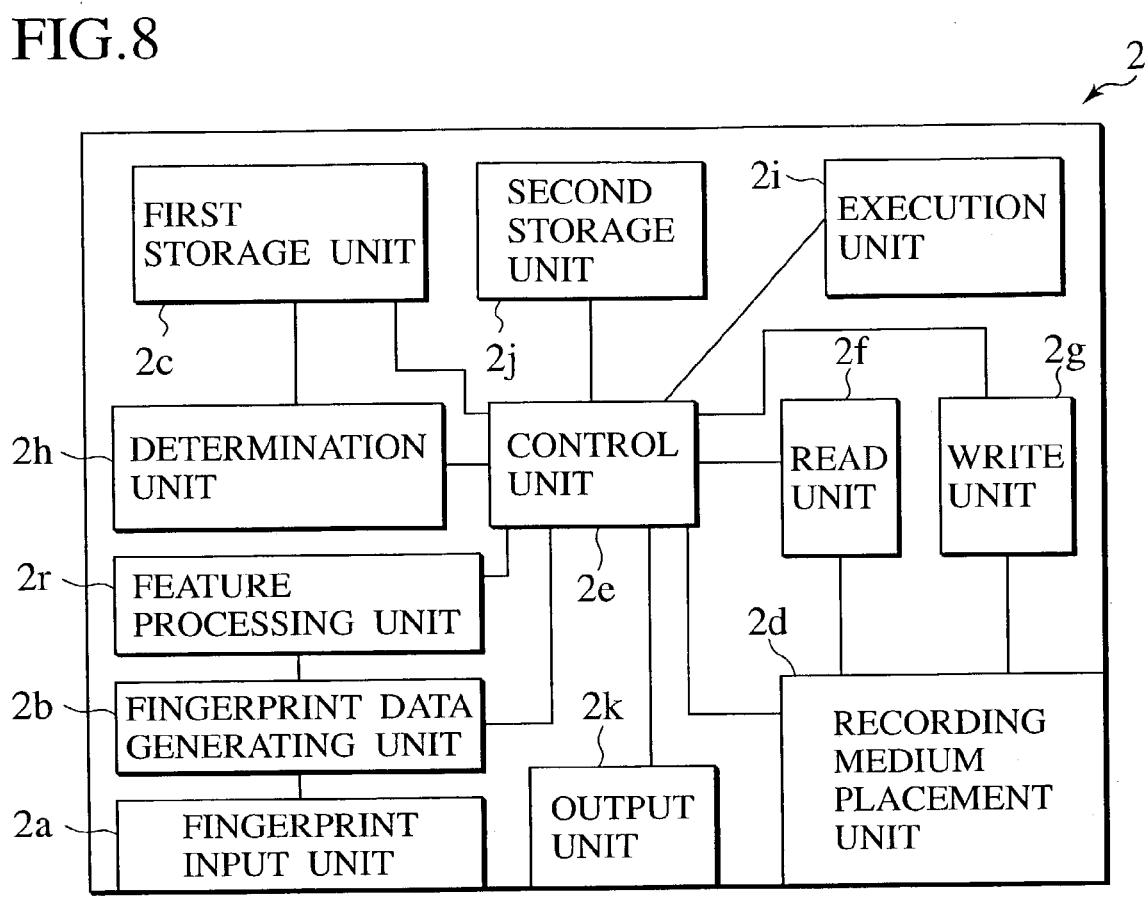
FIG. 8 is a diagram showing the configuration of an electronic device apparatus of a modified example 6 of the embodiment 1.
Figure 9:
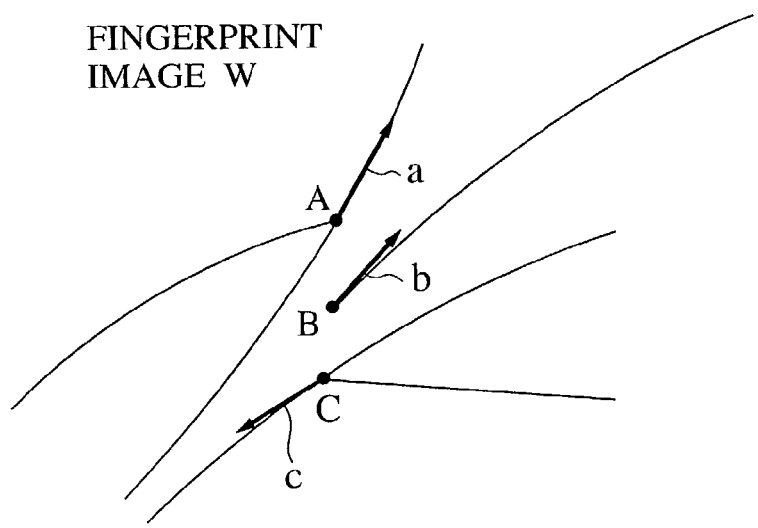
FIG. 9 is a view showing a fingerprint image related to the modified example 6 of the embodiment 1.
Figure 10:
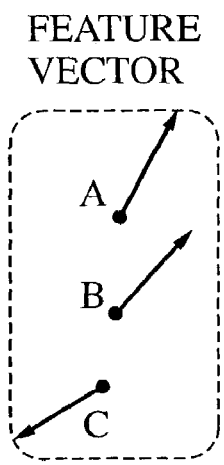
FIG. 10 is a view showing a feature vector related to the modified example 6 of the embodiment 1.
Figure 11:
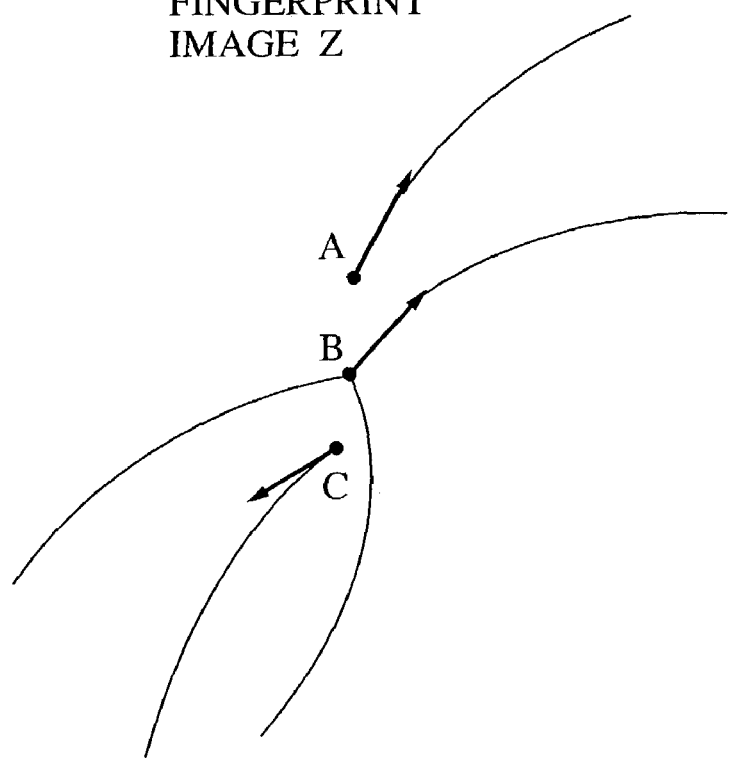
FIG. 11 is a view showing a fingerprint image Z related to the modified example 6 of the embodiment 1.

FIG. 8 is a diagram showing the configuration of an electronic device apparatus 2 according to the modified example 6. In FIG. 8, the same components as those of the electronic device apparatus 2 of the embodiment 1 will be denoted by the same reference numerals, and a description thereof will be omitted. The electronic device apparatus 2 of the modified example 6 has a feature processing unit 2r. The feature processing unit 2r generates first feature data based on first fingerprint data generated by a fingerprint data generating unit 2b. A conceptual description of the processing by the feature processing unit 2r is as below. FIGS. 9, 10, and 11 are conceptual diagrams for explaining the processing by the feature processing unit 2r.

A fingerprint image has a point that is an end of a fingerprint line (hereinafter referred to as edge point), and a branching point of the fingerprint line. Here, the edge point is a point as follows. Specifically, when a given point is set as an origin and a vector (the vector having a magnitude of 1) from the origin toward a given direction (a direction where the fingerprint line exists) exists, the origin corresponds to the edge point (point B in FIG. 9). The vector (the vector having a magnitude of 1) is referred to as a feature vector (vector b in FIG. 9).

The branching point is a point as follows. When there are three vectors (the vectors having a magnitude of 1) that face toward a given direction (a direction where a fingerprint line exists) from a given point set as an origin, the sum of two certain vectors among the three vectors becomes largest. In this case, among the three vectors, the origin of the vector other than the two certain vectors corresponds to the branching point (points A and C in FIG. 9). Moreover, the vector other than the two certain vectors (the vectors having a magnitude of 1) also corresponds to the feature vector (vector a vector c in FIG. 9). In FIG. 9, the vectors a, b, and c correspond to the feature vectors.

In this way, the feature vectors corresponding to a fingerprint image are calculated based on the fingerprint image. Feature vectors corresponding to a fingerprint image W are the feature vectors shown in FIG. 10. Conversely, feature vectors corresponding to a fingerprint image Z shown in FIG. 11 are also the feature vectors shown in FIG. 10.

When the feature vectors corresponding to a given fingerprint image are calculated based on the fingerprint image, it is difficult to derive the given fingerprint image based on the feature vectors. Accordingly, it can be said that it is difficult to derive first fingerprint data, to which is not subjected to the feature process, based on feature vectors generated by the feature processing unit 2r.

Moreover, the feature processing unit 2r stores the first feature data in a first storage unit 2c. Then, a write unit 2g writes the first feature data to the fingerprint data area on a fingerprint-writable recording medium.

When a recording medium having given feature data and a given program is placed in a recording medium placement unit 2d, a read unit 2f reads the given feature data from the recording medium. The read given feature data is transmitted to a determination unit 2h.

The determination unit 2h compares the given feature data recorded on the recording medium with the first feature data stored in the first storage unit 2c, and determines whether or not they match with each other. At this time, similarly to the modified example 3, the determination process of the match is performed based on bits in data, for example. After the above-described determination process, a process by a control unit 2e, a process by an execution unit 2i, and a process by a second storage unit 2j are performed. Descriptions of the process by the control unit 2e, the process by the execution unit 2i, and the process by the second storage unit 2j are the same as those in the descriptions of the modified example 4 in which "encrypted fingerprint data" is substituted by "feature data".

In the present modified example, it is difficult to derive original fingerprint data based on feature data. Accordingly, even if other people come to know the feature data, these people will not learn the original fingerprint data.

Incidentally, a combined process of at least two or more processes among the encryption process, the randomization process, and the feature process may be performed for fingerprint data. Moreover, fingerprint data, in which a combined process of at least two or more of the processes have been performed (such data is hereinafter referred to as combination data), may be stored in the first storage unit 2c. The write unit 2g may write the combined data to the fingerprint data area on a fingerprint-writable recording medium.

The determination unit 2h may compare the combined data recorded on the recording medium with the combined data stored in the first storage unit 2c, and determine whether or not they match with each other. At this time, similarly to the modified example 3, the determination process of the match may be performed based on bits in data, for example.

Incidentally, in the modified examples 4 to 6, when the determination unit 2h determines that given encrypted fingerprint data (or randomized fingerprint data, or feature data) does not match the first encrypted fingerprint data (or first randomized fingerprint data, or first feature data), the modified example 1 may be applied. In this case, the determination unit 2h needs to compare the given encrypted fingerprint data (or randomized fingerprint data, or feature data) with the second encrypted fingerprint data (or second randomized fingerprint data, or second feature data) generated based on the second fingerprint data (the second fingerprint data generated by the fingerprint data generating unit 2b).

MODIFIED EXAMPLE 7

In the above-described embodiment, fingerprint data of one person is recorded on one recording medium. However, there is a case where a plurality of persons wishes to jointly purchase and possess the recording medium. In this case, according to the present modified example, fingerprint data of the plurality of persons is recorded on the recording medium.

The write unit 1b of the generating device 1 generates a blank area, to which fingerprint data of a plurality of persons can be written, on a recording medium as a fingerprint data area. Then, the plurality of persons jointly purchases the recording medium (the recording medium having a program) containing the blank area.

The write unit 2g of the electronic device apparatus 2 writes first fingerprint data read from the first storage unit 2c to the fingerprint data area on the recording medium placed in the recording medium placement unit 2d. This writing process is performed by the write unit 2g of the electronic device apparatus 2 owned by each person.

When the recording medium having the plural pieces of fingerprint data and a given program is placed in the recording medium placement unit 2d, the read unit 2f reads the plural pieces of fingerprint data from the recording medium. Then, the determination unit 2h compares each piece of fingerprint data with the first fingerprint data stored in the first storage unit 2c. If the determination unit 2h determines that any one of the respective pieces of fingerprint data matches the first fingerprint data, the control unit 2e decides that the execution unit 2i is to execute the given program. Then, similarly to the modified example 1, the execution unit 2i executes the given program.

Moreover, the control unit 2e decides that the given fingerprint data and the given program are to be stored in the second storage unit 2j. Then, similarly to the modified example 1, the given fingerprint data and the given program are stored in the second storage unit 2j in a given case.

The above-described determination process, execution process, and storing process are performed by the respective electronic device apparatuses 2 (electronic device apparatuses 2 respectively owned by the plurality of persons).

Also in the present modified example, the modified example 1 can be applied. If any piece of the fingerprint data matches the second fingerprint data, processing of content data (such as an execution process of the given program or a storing process by the second storage unit 2j) is executed.

MODIFIED EXAMPLE 8

In the embodiment 1, when the determination unit 2h compares the fingerprint data recorded on a recording medium with the fingerprint data stored in the first storage unit 2c and they do not match with each other, processing of content data (such as an execution process of a program or a storing process by the second storage unit 2j) is not performed. In the present modified example, this process is modified as below. First, when a recording medium is placed in the recording medium placement unit 2d, the control unit 2e acquires fingerprint data and a program recorded on the recording medium through the read unit 2f. The control unit 2e stores the acquired fingerprint data and the acquired program in the second storage unit 2j.

If the determination unit 2h determines that the given fingerprint data recorded on the recording medium does not match the first fingerprint data stored in the first storage unit 2c, the determination unit 2h transmits the determination result to the control unit 2e. The control unit 2e deletes the fingerprint data and the program stored in the second storage unit 2j based on the determination result.

According to the present modified example, given fingerprint data and a given program are quickly stored in the second storage unit 2j. Also, it is possible to prevent the situation where the given program is stored at length in the electronic device apparatus 2 of a person other than the purchaser of the recording medium.

MODIFIED EXAMPLE 9

Figure 12:
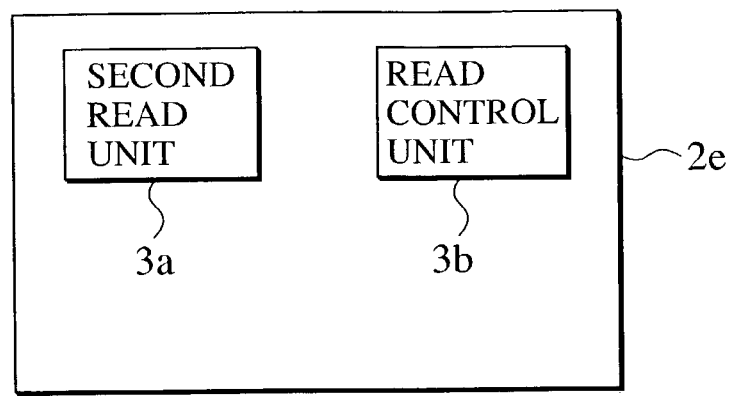
FIG. 12 is a diagram showing the configuration of a control unit according to a modified example 9 of the embodiment 1.

FIG. 12 is a diagram showing the configuration of a control unit in a modified example 9. The control unit 2e of the electronic device apparatus 2 has: a second read unit 3a for reading given fingerprint data and a given program from the second storage unit 2j; and a read control unit 3b for controlling the read process performed by the second read unit 3a. Note that the second read unit 3a and the read control unit 3b may be outside the control unit 2e.

The read control unit 3b has information indicating a storage area in which the given fingerprint data and the given program are stored. The storage area exists in the second storage unit 2j. When the read control unit 3b acquires information indicating mismatch of fingerprint data from the determination unit 2h, the read control unit 3b controls the second read unit 3a as follows. The second read unit 3a is controlled so as not to constantly read the given fingerprint data and the given program from the storage area in the second storage unit 2j.

Note that it is also possible to combine at least two or more modified examples among the modified examples 1 to 9 described above.

MODIFIED EXAMPLE 10

Figure 13:
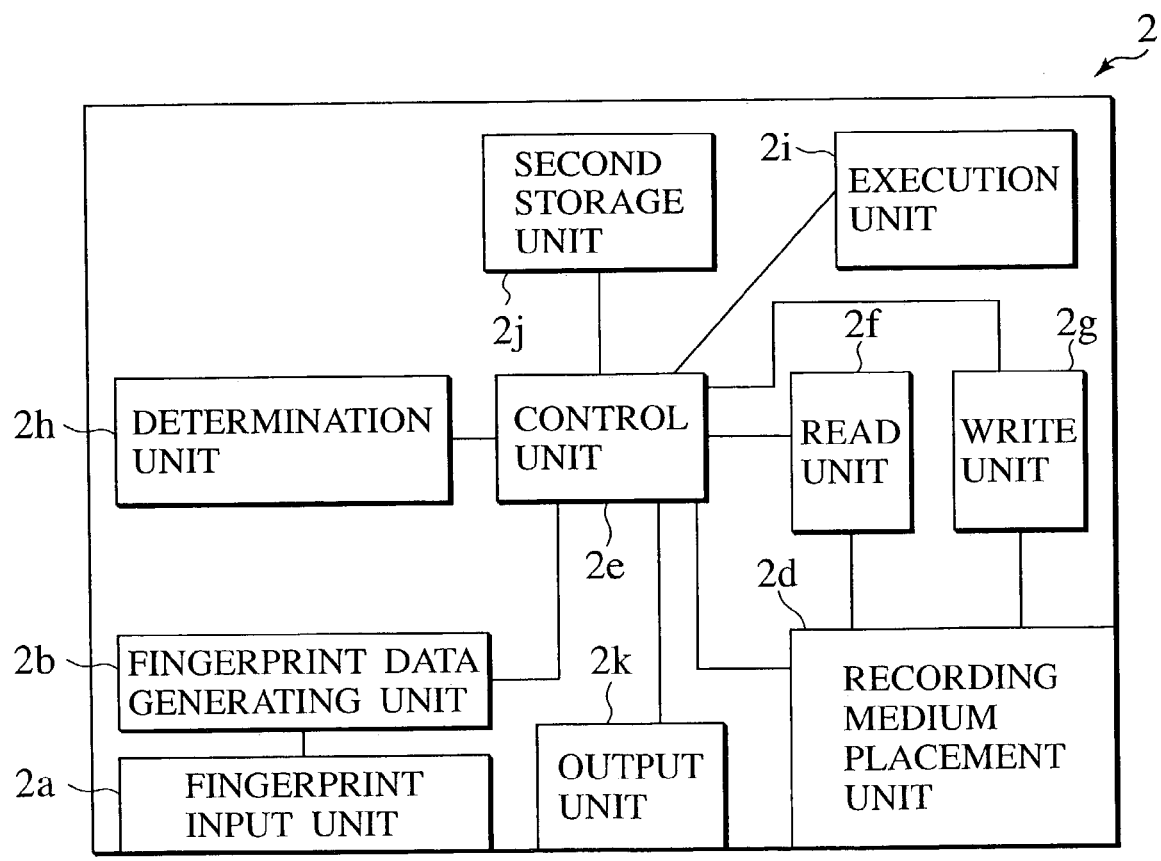
FIG. 13 is a diagram showing the configuration of an electronic device apparatus of a modified example 10 of the embodiment 1.

In the present modified example, an electronic device apparatus 2 does not have a first storage unit 2c. FIG. 13 is a diagram showing the configuration of the electronic device apparatus 2 in the modified example 10. In FIG. 13, the same components as those shown in FIG. 1 will be denoted by the same reference numerals, and a description thereof will be omitted.

The process performed by a system of the modified example 10 will be described using the flowchart shown in FIGS. 3, 4, and 5. In the present modified example, the process in which first fingerprint data generated by a fingerprint data generating unit 2b is stored in a first storage unit 2c (S100, S105, S110, and S115) is eliminated. Moreover, after Step S150, the purchaser who has purchased a recording medium inputs a fingerprint image using a fingerprint input unit 2a. Thereafter, the fingerprint data generating unit 2b generates first fingerprint data based on the inputted fingerprint image.

Then, the generated first fingerprint data is transmitted to a control unit 2e. The control unit 2e instructs a write unit 2g to perform a write process of the first fingerprint data.

Thereafter, the processes of Steps S170 and S175 are performed.

Moreover, instead of Steps S200, S205, and S210, the following process is performed. A recording medium having given fingerprint data and a given program is placed in a recording medium placement unit 2d. Information indicating the placement of the recording medium is transmitted to the control unit 2e. The control unit 2e causes an output unit 2k to output information indicating an instruction to perform an input operation of a fingerprint image. The user of the electronic device apparatus 2 inputs a fingerprint image using the fingerprint input unit 2a. Then, the fingerprint data generating unit 2b generates second fingerprint data based on the inputted fingerprint image.

The generated second fingerprint data is transmitted to a determination unit 2h. The determination unit 2h compares the given fingerprint data (given fingerprint data read by a read unit 2f) with the generated second fingerprint data, and determines whether or not they match with each other. If they match with each other, the following process is performed. In a given case (a case where execution or installation of the program has been requested), processing of content data (such as an execution process of the program by an execution unit 2i or a storing process by a second storage unit 2j) is performed.

MODIFIED EXAMPLE 11

In the above-described embodiment, fingerprint data and a program are respectively recorded on different areas in a recording medium. In the present modified example, this recording can be modified as follows.

First, the control unit 1d of the generating device 1 reads the program from the program storage unit 1c. The control unit id divides the program into a given number of units. Then, each unit of divided program is transmitted to the write unit 1b.

The write unit 1b writes each unit of divided program to a predetermined area on a recording medium. At this time, a given blank area for writing fingerprint data (the blank area is hereinafter referred to as the fingerprint data writable blank area) is provided between each unit of divided program. For example, one unit of divided fingerprint data described later is written to each fingerprint data writable blank area.

Moreover, the write unit 2g writes information specifying areas where the respective units of divided program are recorded and information specifying the plurality of fingerprint data writable blank areas, to a predetermined area (hereinafter referred to as the second recording information area) on the recording medium.

Conversely, the read unit 2f of the electronic device apparatus 2 accesses the second recording information area and acquires the information specifying the plurality of fingerprint data writable blank areas. The read unit 2f transmits the information to the control unit 2e. The control unit 2e calculates the number of the fingerprint data writable blank areas based on the transmitted information.

Then, the control unit 2e reads the first fingerprint data stored in the first storage unit 2c and performs the process described below based on the first fingerprint data. The control unit 2e divides the first fingerprint data into a given number of units. The given number is the number of the fingerprint writable blank areas. As a result, a plurality of units of divided fingerprint data are generated. The control unit 2e causes the write unit 2g to perform the following process. For example, the write unit 2g writes one unit of divided fingerprint data to each fingerprint data writable blank area based on the information specifying the plurality of fingerprint data writable blank areas.

The process by the determination unit 2h is performed as follows. The read unit 2f reads the first fingerprint data stored by the first storage unit 2c, and transmits the first fingerprint data to the determination unit 2h. The determination unit 2h holds the first fingerprint data.

The control unit 2e acquires information (hereinafter referred to as area information) concerning the areas, in which the plurality of units of divided fingerprint data are recorded, from the second recording information area on the recording medium through the read unit 2f. Then, the control unit 2e acquires each unit of divided fingerprint data through the read unit 2f based on the area information. The control unit 2e combines each unit of divided fingerprint data, thus generating fingerprint data. The generated fingerprint data is transmitted to the determination unit 2h. Thereafter, the determination process by the determination unit 2h is performed.

An execution of a program by the execution unit 2i is performed as follows. The program including each unit of divided fingerprint data is transmitted to the execution unit 2i. The execution unit 2i performs the following execution process. The execution unit 2i executes information(or data) other than each unit of divided fingerprint data, for example. Here, the information is included in the program.

MODIFIED EXAMPLE 12

In the embodiment 1 and the modified examples 1 to 11, one electronic device apparatus 2 has the fingerprint input unit 2a, the fingerprint data generating unit 2b, the first storage unit 2c, the second storage unit 2j, the read unit 2f, the write unit 2g, the determination unit 2h, the execution unit 2i, the output unit 2k, the recording medium placement unit 2d, and the control unit 2e. The configuration of the electronic device apparatus 2 may be modified as follows.

The function of the electronic device apparatus 2 is divided into the function of first apparatus and the function of second electronic device apparatus. The first electronic device apparatus has a fingerprint input unit 2a, a fingerprint data generating unit 2b, a first storage unit 2c, a write unit 2g, a recording medium placement unit 2d, and a control unit for controlling each unit. The second electronic device apparatus has a read unit 2f, a write unit 2g, a determination unit 2h, an execution unit 2i, a second storage unit 2j, a recording medium placement unit 2d, an output unit 2k, and a control unit for controlling each unit. In this case, the control unit of the first electronic device apparatus has a function of reading various information from a recording medium.

MODIFIED EXAMPLE 13

Figure 14:
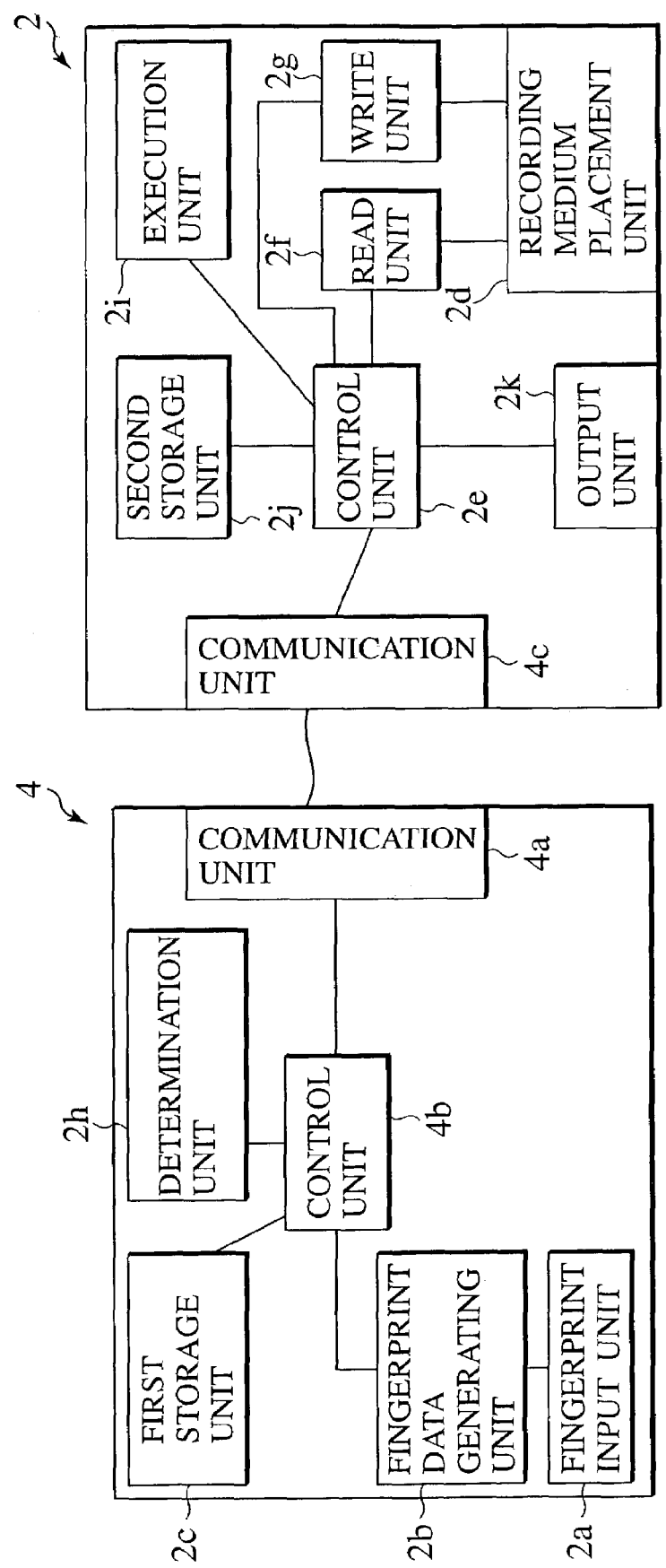
FIG. 14 is a diagram showing the configurations of a communication device and an electronic device apparatus of a modified example 13 of the embodiment 1.

A system of the present modified example has a communication device 4. FIG. 14 is a diagram showing the configurations of a communication device 4 and an electronic device apparatus 2 in the modified example 13. In the present modified example, the same components as those of the embodiment 1 will be denoted by the same reference numerals, and a description thereof will be omitted.

The communication device 4 has a fingerprint input unit 2a, a fingerprint data generating unit 2b, a first storage unit 2c, a determination unit 2h, a communication unit 4a, and a control unit 4b for controlling each unit, which are shown in the embodiment 1. The communication unit 4a performs data communications with a communication unit 4c of an electronic device apparatus 2.

Meanwhile, the electronic device apparatus 2 does not have each unit(a first storage unit 2c, a determination unit 2h, a fingerprint data generating unit 2b, and a fingerprint input unit 2a). The electronic device apparatus 2 has the communication unit 4c.

Moreover, the communication unit 4a of the communication device 4 and the communication unit 4c of the electronic device apparatus 2 are connected, for example, through a cable. Thus, the communication device 4 and the electronic device apparatus 2 correspond to the electronic device apparatus 2 of the embodiment 1.

According to the present modified example, the communication device 4 and the electronic device apparatus 2, as a whole, have the function of the electronic device apparatus 2 of the embodiment 1 by merely attaching the communication device 4 to the electronic device apparatus 2. Therefore, even in the case that the purchaser of a recording medium has a plurality of electronic device apparatus 2, each electronic device apparatus does not need to have a function relating to fingerprint comparing. Specifically, it is sufficient for the purchaser to possess one communication device 4. In the case where the comparing process concerning fingerprints is required, the purchaser merely has to attach the communication device 4 to the electronic device apparatus 2. This enables the comparing process. Therefore, according to the present modified example, costs relating to fingerprint comparing can be reduced.

Embodiment 2

Figure 15:
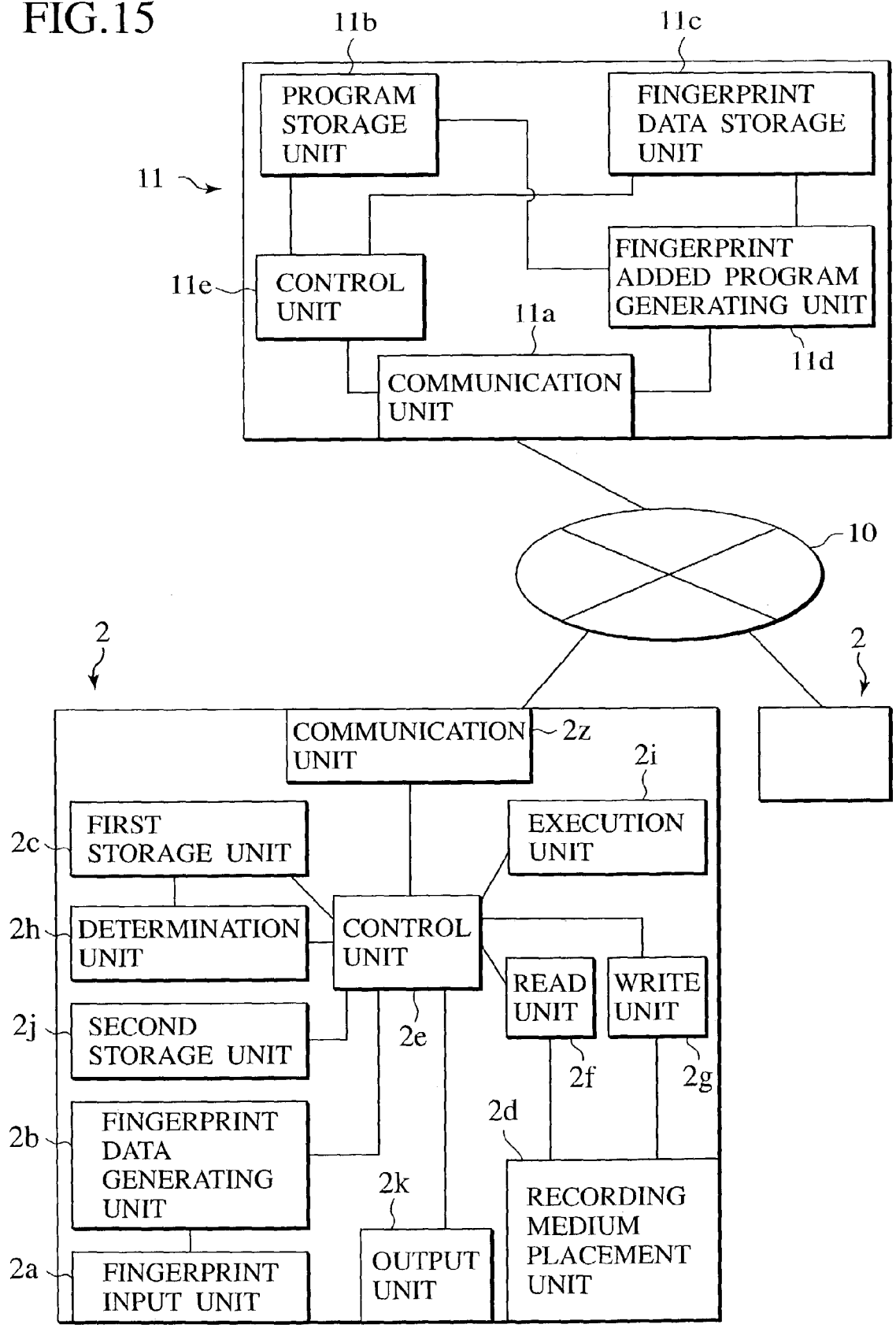
FIG. 15 is a diagram showing the configuration of a content data processing system of an embodiment 2.

FIG. 15 is a diagram showing the configuration of a content data processing system of the embodiment 2. The content data processing system has a plurality of electronic device apparatuses 2 and a server device 11 which is connected to the plurality of electronic device apparatuses through a public network 10. Note that, in the present embodiment, the same components as those of the embodiment 1 will be denoted by the same reference numerals, and a description thereof will be omitted. Here, the electronic device apparatuses 2 are, as an example, PC terminal devices capable of performing data communications with the server device 11 through the public network 10.

(Electronic Device Apparatus 2)

The purchaser, who intends to purchase a given program, inputs a request for the given program by using an input unit (not shown). At this time, information identifying the given program (hereinafter referred to as the program identification information) is also inputted to the input unit. This program identification information is associated with the request for the given program. Meanwhile, a fingerprint image of the purchaser is inputted to a fingerprint input unit 2a. A fingerprint data generating unit 2b generates fingerprint data based on the fingerprint image. The fingerprint data is hereinafter referred to as second fingerprint data.

Incidentally, similarly to the embodiment 1, the fingerprint data generating unit also has a function of generating first fingerprint data of the owner of the electronic device apparatus 2. The first fingerprint data of the owner of the electronic device apparatus 2 is stored in a first storage unit 2c.

The electronic device apparatus 2 has a communication unit 2z. To the communication unit 2z, the following information is transmitted. A control unit 2e gives destination location information and source location information to the inputted given program request and the generated second fingerprint data, respectively. The control unit 2e transmits the given program request and the second fingerprint data to the communication unit 2z. The communication unit 2z transmits the given program request and the second fingerprint data to the given server device 11 through the public network 10, based on the destination location information.

The communication unit 2z also receives a fingerprint-added program from the given server device 11. The fingerprint-added program is generated, based on second fingerprint data and a given program.

The determination unit 2h compares the second fingerprint data contained in the fingerprint-added program with the first fingerprint data (fingerprint data of the owner of the electronic device apparatus 2) stored in the first storage unit 2c, and determines whether or not they match with each other. An execution unit 2i executes the program contained in the fingerprint-added program based on the determination result.

(Server Device 11)

The server device 11 has a communication unit 11a, a program storage unit 11b, a fingerprint data storage unit 11c, a fingerprint-added program generating unit 11d, and a control unit 11e for controlling each unit.

The communication unit 11a receives a given program request and second fingerprint data which are transmitted from each electronic device apparatus 2. The given program request and the second fingerprint data are transmitted to the fingerprint-added program generating unit 11d. The program storage unit 11b stores various programs. The transmitted second fingerprint data is stored in the fingerprint data storage unit 11c.

The fingerprint data storage unit 11c may store all the transmitted second fingerprint data. Moreover, when the identification information of the purchaser is transmitted together with the second fingerprint data from the electronic device apparatus 2, the fingerprint data storage unit 11c may store this identification information as well as the second fingerprint data. Furthermore, the control unit 11e may perform the following control process. If plural units of second fingerprint data corresponding to one unit of identification information of a purchaser are stored in the fingerprint data storage unit 11c, the control unit 11e may control the fingerprint data storage unit 11c so that one unit of second fingerprint data corresponding to the one unit of identification information of the purchaser may be stored.

The fingerprint-added program generating unit 11d generates a fingerprint-added program based on the transmitted second fingerprint data and a given program stored in the program storage unit 11b. To be more precise, the aforementioned is exemplified as below.

The fingerprint-added program generating unit 11d accesses the program storage unit 11b based on the given program request. Based on program identification information, the fingerprint-added program generating unit 11d reads the given program corresponding to the program identification information from the program storage unit 11b. Moreover, the fingerprint-added program generating unit 11d holds the transmitted second fingerprint data and causes the fingerprint data storage unit 11c to store the second fingerprint data.

The fingerprint-added program generating unit 11d generates a fingerprint-added program based on the transmitted second fingerprint data and the given program. At this time, the fingerprint-added program generating unit 11d gives the location information of the electronic device apparatus 2 (the destination location information) to the fingerprint added program.

The fingerprint-added program generating unit 11d transmits the fingerprint-added program to the communication unit 11a. The communication unit 11a transmits the fingerprint-added program to the electronic device apparatus 2 based on the location information of the electronic device apparatus 2.

(Program Execution Method Using Content Data Processing System)

Figure 16:
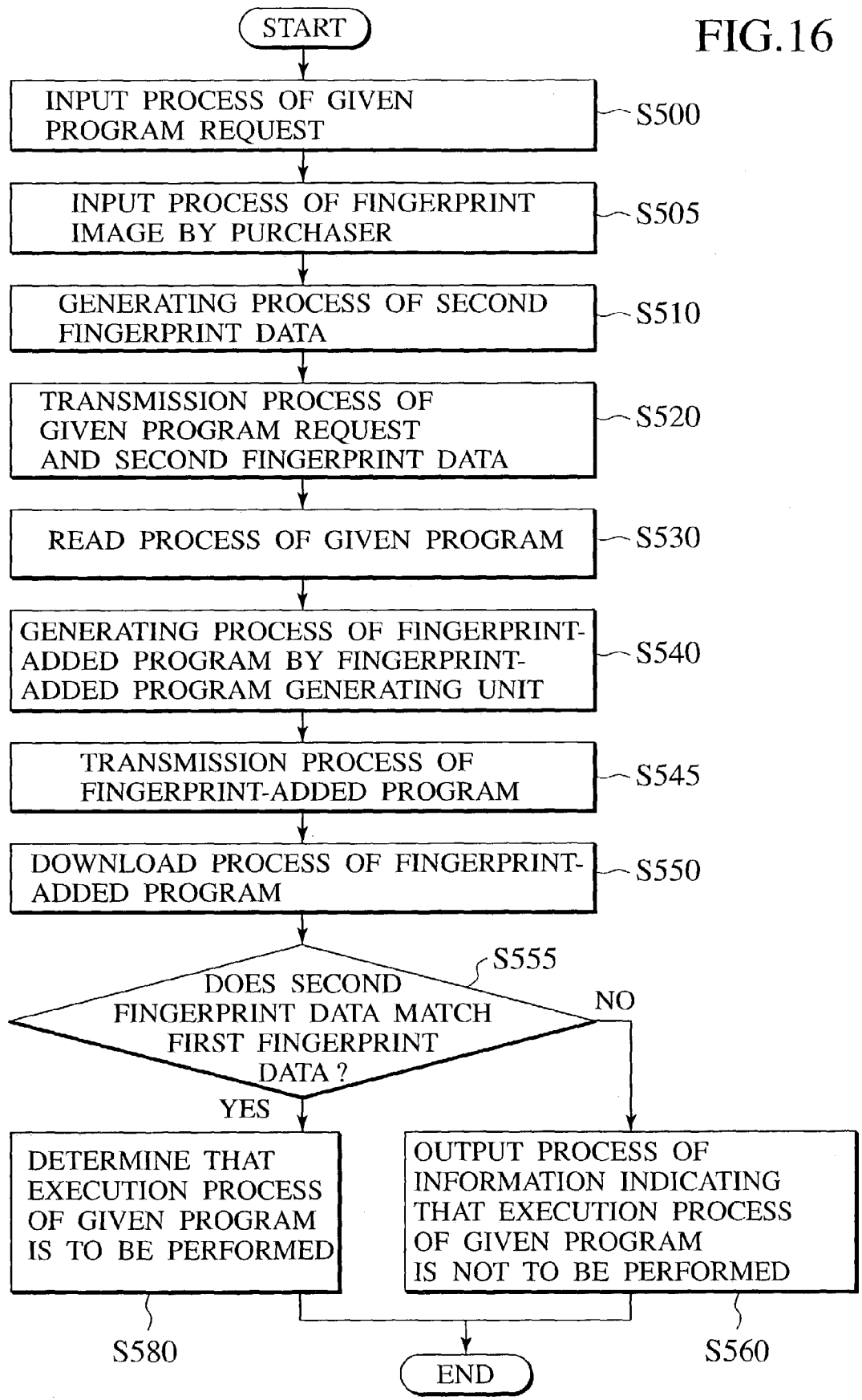
FIG. 16 is a flowchart for explaining a program execution method using the content data processing system of the embodiment 2.

A program execution method using the system according to the embodiment 2 will be described below. FIG. 16 is a flowchart for explaining the method. First, the processes of Steps S100, S105, S110, and S115 are performed.

Then, a person who hopes to acquire a given program ("the person" is hereinafter referred to as "purchaser" in the present embodiment and modified examples thereof) inputs information indicating a request for a given program(hereinafter referred to as a given program request)using the input unit of the electronic device apparatus 2 (S500). At this time, given program identification information and location information (an IP address, for example) of the server device 11, which stores the given program, are inputted to the input unit. The given program identification information is associated with the given program request. The various information inputted is transmitted to the control unit 2e.

Moreover, the purchaser inputs a fingerprint image using the fingerprint input unit 2a (S505). The fingerprint data generating unit 2b generates second fingerprint data based on the inputted fingerprint image (S510). The generated second fingerprint data is transmitted to the control unit 2e. The control unit 2e transmits the given program request and the second fingerprint data to the server device 11 through the communication unit 2z (S520). At this time, the location information (an IP address, for example) of the electronic device apparatus 2 and the given program identification information are transmitted to the server device 11.

The given program request, the second fingerprint data, and the location information of the electronic device apparatus 2 are transmitted to the fingerprint-added program generating unit 11d through the communication unit 11a. At this time, the given program identification information is also transmitted to the fingerprint-added program generating unit 11d. The fingerprint-added program generating unit 11d reads the given program corresponding to the given program identification information from the program storage unit 11b, based on the given program request and the given program identification information (S530).

Moreover, the fingerprint-added program generating unit 11d causes the fingerprint data storage unit 11c to store the transmitted second fingerprint data therein. Then, the fingerprint-added program generating unit 11d generates a fingerprint-added program based on the transmitted second fingerprint data and the read given program (S540).

The method of generating the fingerprint-added program and the type(or structure) of the fingerprint-added program are not particularly limited in the present embodiment. This is applicable to the embodiment 3 described later. For example, the fingerprint-added program may be generated by giving the fingerprint data to the header of the program. Alternatively, the fingerprint-added program may be generated in the way described below.

The program is divided into a plurality of units, thus generating plural units of divided program. Similarly, the fingerprint data is divided into a plurality of units, thus generating plural units of divided fingerprint data. The fingerprint-added program may be generated by inserting one unit of divided fingerprint data between each unit of divided program.

The fingerprint-added program generating unit 11d gives the location information of the electronic device apparatus 2 to the generated fingerprint-added program. Then, the fingerprint-added program generating unit 11d transmits the fingerprint-added program (fingerprint-added program to which the location information of the electronic device apparatus 2 is given) to the communication unit 11a. The communication unit 11a transmits the fingerprint-added program to the electronic device apparatus 2 through the public network 10 based on the location information of the electronic device apparatus 2 (S545).

The communication unit 2z of the electronic device apparatus 2 receives the fingerprint-added program. The fingerprint-added program is transmitted to the control unit 2e. The control unit 2e causes the second storage unit 2j to store (download) the fingerprint-added program therein, and instructs the determination unit 2h to perform a determination process (S550).

The determination unit 2h reads the second fingerprint data contained in the fingerprint-added program that is stored in the second storage unit 2j. Moreover, the determination unit 2h reads the first fingerprint data stored in the first storage unit 2c. Then, the determination unit 2h determines whether or not the second fingerprint data matches the first fingerprint data (S555).

If the determination unit 2h determines that the second fingerprint data does not match the first fingerprint data, the determination unit 2h transmits the determination result to the control unit 2e. The control unit 2e causes the output unit 2k to output information indicating that the given program cannot be executed (S560).

Thereafter, similarly to the modified examples 8 and 9 of the embodiment 1, for example, the control unit 2e may delete the fingerprint-added program stored in the second storage unit 2j. Alternatively, the control unit 2e may control the second read unit 3a so that the fingerprint-added program cannot be read from the second storage unit 2j.

If the determination unit 2h determines that the second fingerprint data matches the first fingerprint data, the determination unit 2h transmits the determination result to the control unit 2e. The control unit 2e causes the output unit 2k to output information indicating that download has been completed. Then, in Step S580, the control unit 2e decides that the execution unit 2i can execute the program (downloaded program).

Thereafter, when a request for executing the program is inputted to the input unit, for example, the request is transmitted to the control unit 2e. The control unit 2e reads the fingerprint-added program from the second storage unit 2j, and transmits the fingerprint-added program to the execution unit 2i. The execution unit 2i executes a program contained in the fingerprint-added program.

(Process for Recording on Recording Medium)

In the present embodiment, the above-described fingerprint-added program stored in the second storage unit 2j of the electronic device apparatus 2 can be recorded on a recording medium.

A user of the electronic device apparatus 2 places a recording medium in the recording medium placement unit 2d. Then, the control unit 2e reads the fingerprint-added program from the second storage unit 2j. The write unit 2g writes the fingerprint-added program to a predetermined area on the recording medium in accordance with instructions from the control unit 2e. Thus, a fingerprint-written recording medium is generated.

After the fingerprint-written recording medium is generated, a process similar to that of the embodiment 1 is performed. In the electronic device apparatus 2 possessed by the purchaser, a program contained in the fingerprint-added program can be executed. This is because the fingerprint data recorded on the recording medium matches the first fingerprint data stored in the first storage unit 2c. On the other hand, in an electronic device apparatus 2 possessed by a person other than the purchaser, the program cannot be executed.

However, even in the electronic device apparatus 2, which is not possessed by the purchaser, the program may be executed in the case where the purchaser inputs a fingerprint image using the fingerprint input unit 2*a* and then fingerprint data is generated. In this case, the fingerprint data recorded on the recording medium matches the generated fingerprint data.

(Functions and Effect)

Also in the present embodiment, the first fingerprint data of the owner of the electronic device apparatus 2 is stored in the first storage unit 2*c* of the electronic device apparatus 2. The fingerprint data generating unit 2*b* generates second fingerprint data based on a fingerprint image of a purchaser who purchases a given program. The fingerprint-added program generating unit 11*d* generates a fingerprint-added program based on the given program transmitted from the server device 11 and the second fingerprint data.

The determination unit 2*h* compares the second fingerprint data contained in the fingerprint-added program with the first fingerprint data stored in the first storage unit 2*c*, and determines whether or not they match with each other. If the determination unit 2*h* determines that they match with each other, the execution unit 2*i* executes the given program.

Accordingly, when a person other than the person who has purchased a given program tries to cause his/her own electronic device apparatus to execute the given program, the determination unit 2*h* determines the mismatch of fingerprint data. Therefore, a person other than the person who has purchased the given program cannot cause his/her own electronic device apparatus to execute the given program. Consequently, only the person who has purchased the given program can cause a given device (his/her own electronic device apparatus, for example) to execute the given program. Thus, an unauthorized act (for example, program execution process) by a person other than the purchaser can be prevented.

(Modified Example 1 of Embodiment 2)

The process of S555 may be modified as follows. If the determination unit 2*h* determines that the second fingerprint data does not match the first fingerprint data, the fingerprint-added program stored in the second storage unit 2*j* may remain stored in the second storage unit 2*j*. Moreover, the process of reading the fingerprint-added program from the second storage unit 2*j* may be performed.

However, if the second fingerprint data stored in the second storage unit 2*j* does not match third fingerprint data generated based on a fingerprint image inputted to the fingerprint input unit 2*a*, the read process of the fingerprint-added program and/or the execution process of the fingerprint-added program are not performed.

(Modified Example 2 of Embodiment 2)

The embodiment 2 may be modified as follows. Specifically, if the determination unit 2*h* determines that the first fingerprint data does not match the second fingerprint data (S555), the output unit 2*k* outputs information indicating a request for a fingerprint of the purchaser.

Then, a person who uses the electronic device apparatus 2 inputs a fingerprint image using the fingerprint input unit 2*a* based on the output of the output unit 2*k*. The fingerprint data generating unit 2*b* generates third fingerprint data based on the inputted fingerprint image. The third fingerprint data is transmitted to the determination unit 2*h*.

The determination unit 2*h* compares the generated third fingerprint data with the held second fingerprint data, and determines whether or not they match with each other. If the determination unit 2*h* determines that they match with each other, the control unit 2*e* decides that the given program is to be executed. Thereafter, when a request for executing the given program is inputted to the input unit, the execution unit 2*i* executes the given program.

(Modified Example 3 of Embodiment 2)

In the embodiment 2, a certain electronic device apparatus 2 (PC terminal device) transmits fingerprint data to the server device 11. Thereafter, the electronic device apparatus 2 receives a fingerprint-added program from the server device 11, and then performs the comparing process and the process of recording the fingerprint-added program on a recording medium. When the recording medium having the fingerprint-added program is placed in other electronic device apparatus 2 (video game device), the other electronic device apparatus 2 performs the read process of the fingerprint-added program and the execution process of the fingerprint-added program. In the present modified example, the embodiment 2 may be modified as below.

Figure 17:
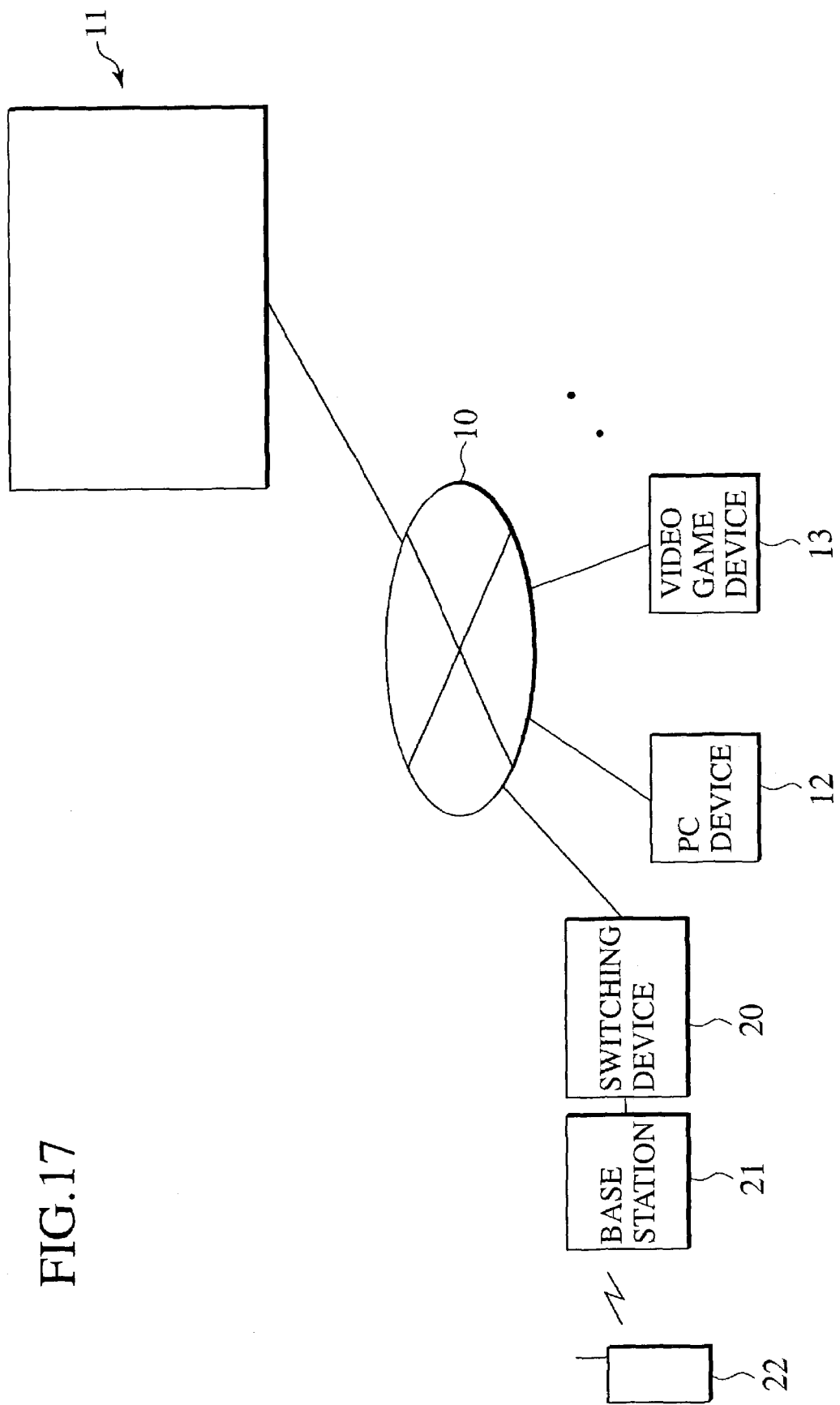
FIG. 17 is a diagram showing the configuration of a content data processing system of a modified example 3 of the embodiment 2.

FIG. 17 is a diagram showing the configuration of a content data processing system according to the modified example 3. In FIG. 17, the same components as those of the embodiment 2 will be denoted by the same reference numerals, and a description thereof will be omitted.

The content data processing system has a server device 11, a plurality of PC terminal devices 12 connected to the server device 11 through a public network 10, a plurality of video game devices 13, and a plurality of switching devices 20. A base station 21, which wirelessly communicates with a mobile terminal device 22, is connected to each switching device 20. Each device (PC terminal device, video game device, or mobile terminal device) has the function of the electronic device apparatus 2 of the embodiment 2.

A request for a given program and second fingerprint data are transmitted from each device(for example, PC terminal device)to the server device 11. The server device 11 generates a fingerprint-added program based on the request transmitted from each device. The server device 11 transmits the fingerprint-added program to each device. Thereafter, a process by a determination unit 2*h*, a process by a control unit 2*e*, a process by an execution unit 2*i*, and a process of writing the fingerprint-added program to a recording medium are performed. Note that the mobile terminal device 22 performs data communications with the server device 11 through the base station 21 and the switching device 20.

In the modified example 3, each device (video game device 13, mobile terminal device 22, for example) can perform a process of executing a program contained in the fingerprint-added program and a process of recording the fingerprint-added program on the recording medium, without conducting data communications with a PC terminal device 12.

Embodiment 3

Figure 18:
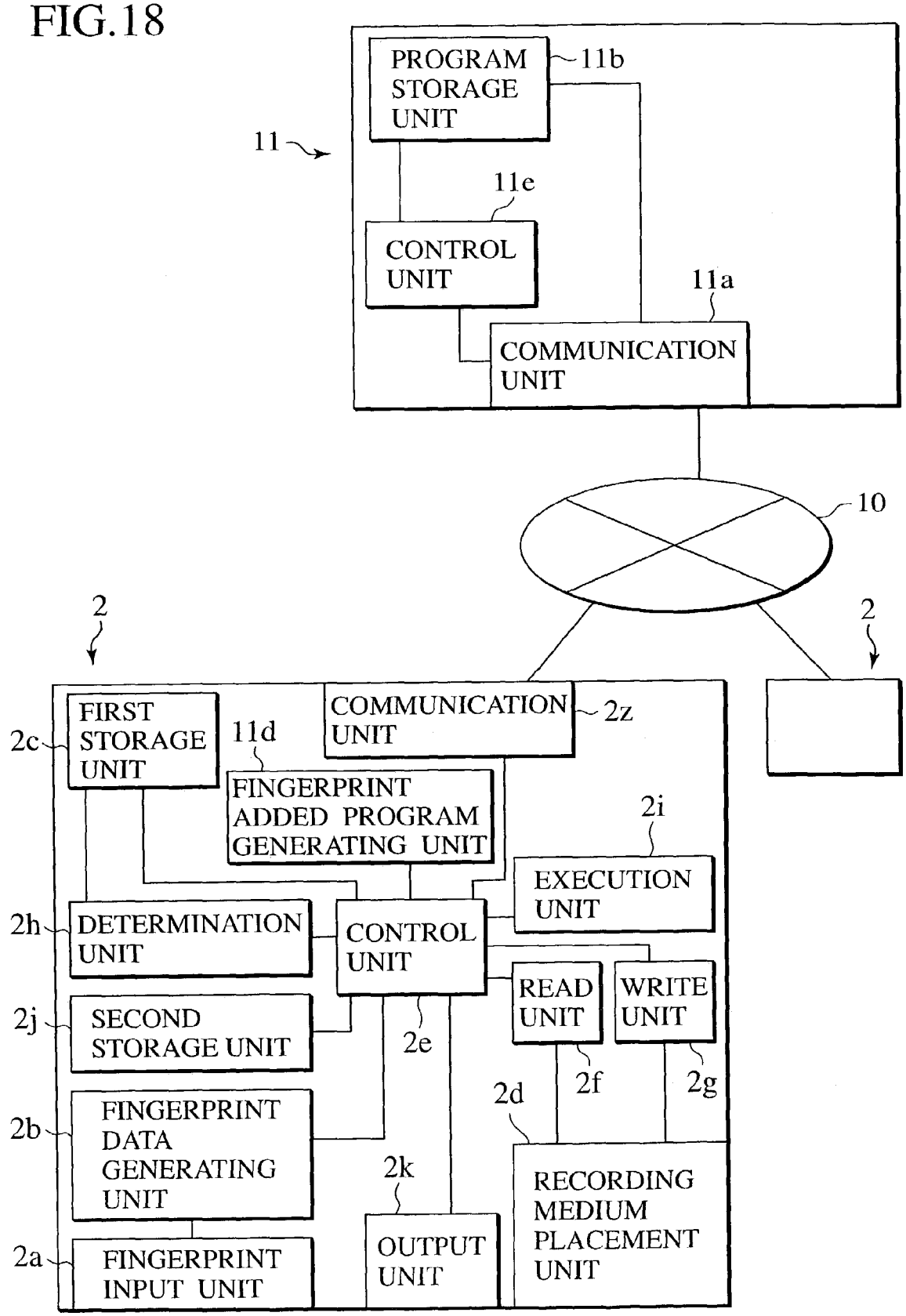
FIG. 18 is a diagram showing the configuration of a content data processing system of an embodiment 3.

In the embodiment 2, a transmission/reception process of fingerprint data is performed through a circuit of the public network 10. The present embodiment has an object of preventing fingerprint data from being stolen during a transmission/reception process of the fingerprint data. FIG. 18 is a diagram showing the configuration of a content data processing system of the embodiment 3. The same components and functions as those of the embodiment 2 will be denoted by the same reference numerals, and a description thereof will be omitted.

(Configuration of Electronic Device Apparatus 2)

Each electronic device apparatus 2 has a fingerprint-added program generating unit 11*d*. The fingerprint-added program generating unit 11*d* generates a fingerprint-added program, based on a program transmitted from a server device 11 and second fingerprint data generated by a fingerprint data generating unit 2*b*.

A determination unit 2*h* compares the second fingerprint data contained in the fingerprint-added program with first fingerprint data stored in a first storage unit 2*c*, and determines whether or not they match with each other. An execution unit 2*i* executes a program contained in the fingerprint-added program based on the determination result.

(Configuration of Server Device)

The server device 11 has a communication unit 1*a*, a control unit 11*e*, and a program storage unit 11*b*. The program storage unit 11*b* stores various programs. The communication unit 11*a* receives a program request transmitted from each electronic device apparatus 2. The communication unit 11*a* also transmits a given program to the electronic device apparatus 2 based on the received program request.

(Process by Content Data Processing System)

Figure 19:
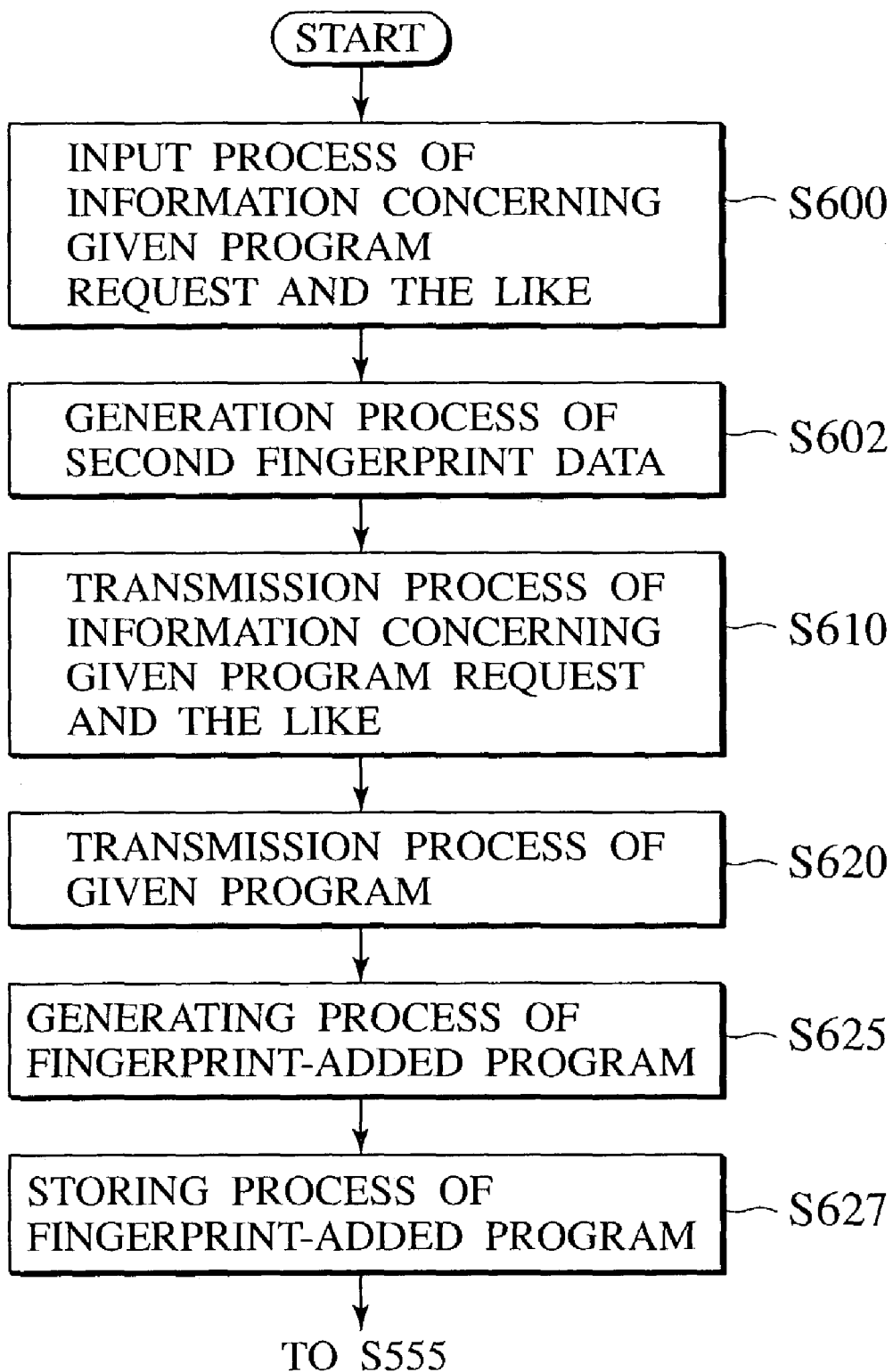
FIG. 19 is a flowchart for explaining a program execution method using the content data processing system of the embodiment 3.

A program execution method using the content data processing system of the embodiment 3 will be described below. FIG. 19 is a flowchart for explaining the method. Note that descriptions for the same processes as those of the embodiment 2 (FIG. 16) will be simplified.

First, a user of the electronic device apparatus 2 (a person who hopes to acquire a given program) inputs information indicating a request for a given program and identification information of the given program, using an input unit (S600). The user (hereinafter referred to as the purchaser in the present embodiment) further inputs a fingerprint image using a fingerprint input unit 2*a*. The fingerprint data generating unit 2*b* generates second fingerprint data based on the fingerprint image(S602). The fingerprint data generating unit 2*b* transmits the generated second fingerprint data to the fingerprint-added program generating unit 11*d*. At this time, the information indicating the request for the given program and the identification information of the given program are transmitted to a control unit 2*e*.

The control unit 2*e* transmits the information indicating the request and the identification information to the server device 11 through a communication unit 2*z* and the public network 10 (S610).

The information, such as information indicating the request, is transmitted to the control unit 1*ie* through the communication unit 11*a*. The control unit 2*e* acquires the given program from the program storage unit 11*b* based on the information, such as information indicating the request. The control unit 2*e* transmits the acquired given program to the electronic device apparatus 2 through the communication unit 11*a* (S620).

The communication unit 2*z* of the electronic device apparatus 2 receives the given program. The given program is transmitted to the fingerprint-added program generating unit 11*d*. The fingerprint-added program generating unit 11*d* generates a fingerprint-added program based on the transmitted given program and the second fingerprint data that is held by the unit 11*d* (S625).

The fingerprint-added program is transmitted to a second storage unit 2*j* and stored therein (S627). Moreover, information indicating that the fingerprint-added program has been generated is transmitted to the determination unit 2*h*. The subsequent processes are the same as the processes from Step S555.

According to the present embodiment, in addition to the effect of the embodiment 2, a transmission/reception process of the fingerprint data through the public network 10 is not performed. This prevents fingerprint data(for example, fingerprint data of the purchaser) from being stolen and wrongfully used by anyone else.

Moreover, also in the present embodiment, the recording process on a recording medium in the embodiment 2 can be applied. Furthermore, in the present embodiment, each modified example of the embodiment 2 may also be applied.

Application Example 1

In the embodiments 1 to 3, each modified example of the embodiment 1, and each modified example of the embodiment 2, descriptions are made of a case where the electronic device apparatus 2 is a PC terminal device or a video game device. The present invention is not limited to these, and the electronic device 2 may be a sound reproducing device or an image reproducing device, for example.

A sound reproducing device means a CD player device, for example, and an image reproducing device means a DVD player device, for example.

In the embodiment 1, description was made of a case where content data is a program. In the present application example, content data is, for example, sound data (such as data relating to music) or video and/or image data (such as data relating to a movie). Not a program, but rather, sound data or image data(or video data) is recorded on a recording medium.

In an electronic device apparatus of an application example 1, a reproducing unit (not shown) is provided instead of an execution unit 2*i*. The sound data/image data(or video data) recorded on the recording medium is transmitted from a read unit 2*f* to the reproducing unit. The reproducing unit performs an amplification process relating to the sound data/image data(or video data), for example, thus performing a reproducing process.

When a PC terminal device (or a video game device) writes fingerprint data to a fingerprint-writable recording medium (from S150 to S175) and then the recording medium is placed in a sound reproducing device or an image reproducing device, the following processes may be performed. Specifically, a comparing process of fingerprint data by a determination unit 2*h*, a reproducing process by a reproducing unit, and a storing process by a second storage unit 2*j* (from S200 to S240) may be performed.

Meanwhile, when a sound reproducing device (or an image reproducing device) writes fingerprint data to a recording medium (from S150 to S175) and then the recording medium is placed in a PC terminal device, the following process may be performed. Specifically, the processes from Steps S200 to S240 may be performed.

In the above descriptions of the embodiments 1 to 3, the modified examples 1 to 13 of the embodiment 1, and the modified examples 1 to 3 of the embodiment 2, "program" can be substituted by "sound data/image data(or video data)", and "execute concerning program" can be substituted by "reproduce concerning sound data/image data(or video data)". By such substitution, the present application example can be applied in the embodiments 1 to 3, the modified examples 1 to 13 of the embodiment 1, and the modified examples 1 to 3 of the embodiment 2.

Incidentally, content data may be character data. For example, if the character data is contained in a program, an execution process by an execution unit is performed. If the character data is contained in image data and/or video data, a reproducing process by a reproducing unit is performed.

Application Example 2

In the embodiments 1 to 3, each modified example of the embodiment 1, each modified example of the embodiment 2, and the application example 1, the electronic device apparatus 2 has the fingerprint input unit 2*a* and the fingerprint data generating unit 2*b*. Moreover, in the embodiments 1 to 3, each modified example of the embodiment 1, each modified example of the embodiment 2, and the application example 1, a process relating to fingerprint data (such as a comparing process) has been described. The present invention is not limited to this.

In the electronic device apparatus 2, a photographing unit (not shown) and an image data generating unit (not shown) may be provided instead of the fingerprint input unit 2a and the fingerprint data generating unit 2b. The photographing unit photographs an authentication image, which is an image of a possession (such as a seal impression, gelatin, rubber, wood, metal, or chemical products) of the owner of the electronic device apparatus 2.

The authentication image photographed is transmitted to the image data generating unit. The image data generating unit generates authentication image data based on the transmitted authentication image.

In the above descriptions of the embodiments 1 to 3, the modified examples 1 to 13 of the embodiment 1, and the modified examples 1 to 3 of the embodiment 2, "fingerprint data" can be substituted by "authentication image data", "a fingerprint image is inputted to the fingerprint input unit 2a" can be substituted by "the photographing unit photographs an authentication image", and "the fingerprint data generating unit 2b generates fingerprint data" can be substituted by "the image data generating unit generates authentication image data". By these substitutions, the present application example can be applied in the embodiments 1 to 3, the modified examples 1 to 13 of the embodiment 1, and the modified examples 1 to 3 of the embodiment 2.

Note that the electronic device 2 may have the fingerprint input unit 2a, the fingerprint data generating unit 2b, the photographing unit, and the image data generating unit.

Various modifications will become possible for those skilled in the art after receiving the teachings of the present disclosure without departing from the scope thereof.

What is claimed is:

1. An electronic device apparatus for reading content data from a recording medium to which content data containing at least any one of a program, character data, sound data, video data and image data is written, and for processing the content data, the electronic device apparatus comprising:
    an authentication image data generator for acquiring an authentication image containing an image of a fingerprint of an owner of the electronic device apparatus and/or an image of a possession of the owner, and for generating first authentication image data based on the acquired authentication image;
    a writer for writing the first authentication image data which is generated by the authentication image generator, to the recording medium which the owner has purchased;
    a reader for reading given authentication image data from the recording medium to which the given authentication image data and given content data are written;
    an outputter for outputting an input request for an authentication image;
    a determiner for comparing the given authentication image data with second authentication image data, and for determining whether or not the given authentication image data matches the second authentication image data in the case where the authentication image data generator has acquired the authentication image inputted based on an output result by the outputter and has generated the second authentication image data based on the acquired authentication image; and
    a processor for processing the given content data based on a determination result by the determiner.

2. An electronic device apparatus for reading content data containing at least any one of a program, character data, sound data, video data and image data and performs a process relating to the content data, the content data being transmitted from a service device through a public network, the electronic device apparatus comprising:
    a first authentication image data generator for acquiring an authentication image containing an image of a fingerprint of an owner of the electronic device apparatus and/or an image of a possession of the owner, and for generating first authentication image data based on the acquired authentication image;
    a first unit configured to stores the first authentication image data;
    a second authentication image data generator for acquiring an authentication image containing an image of a fingerprint of a purchaser who purchases the content data and/or an image of a possession of the purchaser and for generating second authentication image data based on the acquired authentication image;
    a determiner for comparing the second authentication image data contained in an authentication image-added content, which is generated based on the second authentication image data and the content data with the first authentication image data stored in the first unit, and for determining whether or not the second authentication image data matches the first authentication image data; and
    a processor for processing the content data contained in the authentication image-added content based on a determination result by the determiner.

3. The electronic device apparatus according to claim 2, further comprising:
    an authentication image-added content generator for generating an authentication image-added content based on the content data transmitted from the server device and the second authentication image data generated by the second authentication image data generator,
    wherein the determiner compares the second authentication image data contained in the authentication image-added content with the first authentication image data stored in the first unit, and determines whether or not the second authentication image data matches the first authentication image data, and
    the processor processes the content data contained in the authentication image-added content based on a determination result by the determiner.

4. The electronic device apparatus according to claim 2, further comprising:
    an outputter for outputting an input request for an authentication image in the case where the determiner has determined that the second authentication image data contained in the authentication image-added content does not match the first authentication image data stored in the first storage,
    wherein the second authentication image data generator generates in the case that an authentication image is inputted based on an output resulted by the outputter, third authentication image data based on the inputted authentication image,
    the determiner compares the third authentication image data with the second authentication image data contained in the authentication image-added content, and determines whether or not the third authentication image data matches the second authentication image data, and
    the processor processes the content data contained in the authentication image-added content based on a determination result by the determiner.

5. The electronic device apparatus according to claim 4, further comprising:
    a second unit configured to store the authentication image-added content, wherein the determiner compares the second authentication image data, which is contained in the authentication image-added content stored in the second unit, with the first authentication image data stored in the first storage and/or the third authentication image data, and determines whether or not the second authentication image data matches the first authentication image data or the third authentication image data, and the processor processes the content data, which is contained in the authentication image-added content stored in the second unit, based on a determination result by the determiner.

6. An electronic device apparatus, processing content data containing at least any one of a program, character data, sound data, video data and image data, the apparatus comprising:
- a first acquisition unit configured to acquire an authentication image data of an owner, generated on the basis of a fingerprint image of the owner of the electronic device apparatus;
- a second acquisition unit configured to acquire an authentication image data of a purchaser, generated on the basis of a fingerprint image of the purchaser who purchases the content data;
- an authorizer configured to authorize use of the content data in the case where the authentication image data of the owner matches the authentication image data of the purchaser; and
- a third acquisition configured to acquire an authentication image data of a user, generated on the basis of the fingerprint image of the user of the electric device apparatus in the case where the authentication image data of the owner does not match the authentication image data of the purchaser;
- wherein the authorizer authorizes use of the content data in the case where the authentication image data of the user matches the authentication image data of the purchaser, even if the authentication image data of the owner does not match the authentication image data of the purchaser.

7. The electronic device apparatus of claim 6, further comprising:
- a first storage configured to store the authentication image data of the owner;
- a second storage configured to store the authentication image data of the purchaser; and
- a scanner configured to scan the fingerprint image of the user, wherein the first acquisition unit reads the authentication image data of the owner from the first storage;

the second acquisition unit reads the authentication image data of the purchaser from the second storage; and the third acquisition unit generates the authentication image data of the user on the basis of the fingerprint image of the user scanned by the scanner.

8. The electronic device apparatus according to claim 6, further comprising:
- a receiver configured to receive the content data from a server apparatus connected to the electronic device apparatus via a network, wherein the content data includes the authentication image data of the purchaser, and the second acquisition unit extracts the authentication image data of the purchaser from the received content data.

9. An electronic device apparatus, processing content data containing at least any one of a program, character data, sound data, video data and image data, the apparatus comprising:
- a first acquisition unit configured to acquire an authentication image data of an owner, generated on the basis of an image of a possession belonging to the owner of the electronic device apparatus;
- a second acquisition unit configured to acquire an authentication image data of a purchaser, generated on the basis of an image of a possession belonging to the purchaser who purchases the content data;
- an authorizer configured to authorize use of the content data in the case where the authentication image data of the owner matches the authentication image data of the purchaser; and
- a third acquisition unit configured to acquire an authentication image data of a user, generated on the basis of an image of a possession belonging to the user of the electric device apparatus, in the case where the authentication image data of the owner does not match the authentication image data of the purchaser;
- wherein the authorizer authorizes use of the content data in the case where the authentication image data of the user matches the authentication image data of the purchaser, even if the authentication image data of the owner does not match the authentication image data of the purchaser.

* * * * *